(12) United States Patent
Pallotta et al.

(10) Patent No.: US 10,259,602 B2
(45) Date of Patent: Apr. 16, 2019

(54) METHOD FOR FORMING PACKAGES

(71) Applicant: The Procter & Gamble Company, Cincinnati, OH (US)

(72) Inventors: Shawn Christopher Pallotta, Maineville, OH (US); Jason Matthew Orndorff, Lawrenceburg, IN (US); Gavin John Broad, Liberty Township, OH (US); Adal Amine Tecleab, Cincinnati, OH (US); Cullen Joseph Breithaupt, Cincinnati, OH (US)

(73) Assignee: The Procter and Gamble Company, Cincinnati, OH (US)

( * ) Notice: Subject to any disclaimer, the term of this patent is extended or adjusted under 35 U.S.C. 154(b) by 0 days.

(21) Appl. No.: 15/724,290

(22) Filed: Oct. 4, 2017

(65) Prior Publication Data
US 2018/0022486 A1    Jan. 25, 2018

Related U.S. Application Data

(63) Continuation-in-part of application No. 13/776,761, filed on Feb. 26, 2013, now Pat. No. 9,809,336.
(Continued)

(51) Int. Cl.
| | |
|---|---|
| *B29C 51/22* | (2006.01) |
| *B65B 9/04* | (2006.01) |
| *B65B 31/04* | (2006.01) |
| *C11D 17/04* | (2006.01) |
| *B65B 9/02* | (2006.01) |
| *B65B 45/00* | (2006.01) |

(52) U.S. Cl.
CPC ............ *B65B 9/042* (2013.01); *B29C 51/225* (2013.01); *B65B 9/023* (2013.01); *B65B 31/045* (2013.01); *C11D 17/043* (2013.01); *B29K 2995/0062* (2013.01); *B65B 45/00* (2013.01)

(58) Field of Classification Search
CPC .............. B65B 9/00; B65B 9/02; B65B 9/045
USPC .................................. 53/455, 389.2
See application file for complete search history.

(56) References Cited

U.S. PATENT DOCUMENTS

| | | |
|---|---|---|
| 2,655,978 A | 10/1953 | Gonda et al. |
| 3,184,895 A | 5/1965 | O'Connor |
| (Continued) | | |

FOREIGN PATENT DOCUMENTS

| | | |
|---|---|---|
| BE | 900166 A1 | 11/1984 |
| EP | 0840355 A1 | 5/1998 |
| (Continued) | | |

OTHER PUBLICATIONS

U.S. Appl. No. 13/776,753, filed Feb. 26, 2013, Shawn Christopher Pallotta et al.
(Continued)

*Primary Examiner* — Andrew M Tecco
*Assistant Examiner* — Mary C Hibbert
(74) *Attorney, Agent, or Firm* — Angela K. Haughey

(57) ABSTRACT

A method and apparatus for formation, filling, and sealing unit dose packages for consumer products are described herein. A filling system with a filling control system is also disclosed. Although the filling system is described in conjunction with a method for forming, filling, and sealing unit dose packages, the filling system and filling control system can be used in other dispensing processes.

7 Claims, 16 Drawing Sheets

Related U.S. Application Data

(60) Provisional application No. 61/604,076, filed on Feb. 28, 2012.

(56) References Cited

U.S. PATENT DOCUMENTS

| | | | |
|---|---|---|---|
| 3,218,776 A | 11/1965 | Cloud | |
| 3,343,336 A | 9/1967 | Bradford | |
| 3,354,611 A | 11/1967 | Powell | |
| 3,475,878 A | 11/1969 | West, Jr. | |
| 3,555,768 A | 1/1971 | Miller | |
| 3,673,760 A | 7/1972 | Canamero et al. | |
| 3,685,251 A | 8/1972 | Mahaffy et al. | |
| 3,958,394 A | 5/1976 | Mahaffy et al. | |
| 3,978,637 A | 9/1976 | Mauriello | |
| 4,017,247 A | 4/1977 | Soukup et al. | |
| 4,034,536 A | 7/1977 | Mahaffy et al. | |
| 4,047,359 A | 9/1977 | Gronebaum | |
| 4,235,329 A | 11/1980 | Crawford et al. | |
| 4,301,639 A * | 11/1981 | Hamilton | B65B 9/042 53/456 |
| 4,329,830 A | 5/1982 | Omori | |
| 4,349,997 A | 9/1982 | Hayasaka et al. | |
| 4,537,016 A | 8/1985 | Shanklin et al. | |
| 4,549,386 A | 10/1985 | Wilson | |
| 4,735,738 A | 4/1988 | Willman | |
| 4,807,420 A | 2/1989 | Barker | |
| 4,819,406 A | 4/1989 | Redmond | |
| 4,876,842 A | 10/1989 | Ausnit | |
| 4,970,846 A | 11/1990 | Leino | |
| 4,987,728 A | 1/1991 | Ventura | |
| 5,224,601 A | 7/1993 | Gouge et al. | |
| 5,408,806 A | 4/1995 | Lin et al. | |
| 5,524,420 A | 6/1996 | Ikuta | |
| 5,564,261 A | 10/1996 | Kiner | |
| 5,896,994 A | 4/1999 | Krebs | |
| 5,954,086 A | 9/1999 | Ronchi | |
| 5,996,650 A | 12/1999 | Phallen et al. | |
| 6,037,319 A | 3/2000 | Dickler et al. | |
| 6,138,436 A | 10/2000 | Malin et al. | |
| 6,227,415 B1 | 5/2001 | Ritsche et al. | |
| 6,244,021 B1 | 6/2001 | Ausnit et al. | |
| 6,293,402 B1 | 9/2001 | Rogers et al. | |
| 6,363,693 B1 | 4/2002 | Edwards et al. | |
| 6,378,274 B1 | 4/2002 | Harbour | |
| 6,481,183 B1 | 11/2002 | Schmidt | |
| 6,484,479 B1 * | 11/2002 | Minion | B65B 5/024 53/282 |
| 6,484,745 B1 | 11/2002 | Navarro | |
| 6,689,214 B2 | 2/2004 | Burmester et al. | |
| 6,745,545 B2 | 6/2004 | Schneider et al. | |
| 6,790,312 B2 | 9/2004 | Capitani et al. | |
| 6,904,735 B2 | 6/2005 | McMahon et al. | |
| 6,955,733 B2 | 10/2005 | Miller et al. | |
| 6,986,236 B2 | 1/2006 | Schneider et al. | |
| 7,325,386 B2 | 2/2008 | Kissling | |
| 7,325,688 B1 | 2/2008 | Tessmer et al. | |
| 7,797,912 B2 | 9/2010 | Hammond | |
| 8,171,703 B2 * | 5/2012 | Arlinghaus | B65B 31/028 53/405 |
| 2002/0033004 A1 | 3/2002 | Edwards et al. | |
| 2002/0170271 A1 | 11/2002 | Pearce et al. | |
| 2003/0089084 A1 | 5/2003 | Ausnit | |
| 2003/0116204 A1 | 6/2003 | Volovets et al. | |
| 2003/0126838 A1 | 7/2003 | McMahon et al. | |
| 2003/0145558 A1 | 8/2003 | Schneider et al. | |
| 2003/0172622 A1 | 9/2003 | Kinigakis et al. | |
| 2004/0045256 A1 | 3/2004 | Kinigakis et al. | |
| 2004/0144065 A1 | 7/2004 | Smith et al. | |
| 2004/0194429 A1 | 10/2004 | Schneider et al. | |
| 2005/0183394 A1 | 8/2005 | Hammond et al. | |
| 2005/0284106 A1 | 12/2005 | Ausnit | |
| 2006/0144020 A1 | 7/2006 | Kettner | |
| 2006/0177156 A1 | 8/2006 | Owen et al. | |
| 2007/0199280 A1 | 8/2007 | Thomas et al. | |
| 2007/0252276 A1 | 11/2007 | Lloyd-George | |
| 2008/0000202 A1 | 1/2008 | Kettner et al. | |
| 2008/0185402 A1 | 8/2008 | Fontela et al. | |
| 2009/0199877 A1 | 8/2009 | Miyahara et al. | |
| 2010/0061666 A1 | 3/2010 | Sprehe et al. | |
| 2010/0147884 A1 | 6/2010 | Compton et al. | |
| 2010/0307948 A1 | 12/2010 | Domingues et al. | |
| 2010/0310732 A1 * | 12/2010 | Domingues | A21D 10/025 426/128 |
| 2011/0027438 A1 * | 2/2011 | Finkowski | A21C 9/086 426/413 |
| 2011/0036741 A1 | 2/2011 | Moehlenbrock | |
| 2011/0038570 A1 | 2/2011 | Moehlenbrock et al. | |
| 2011/0038571 A1 | 2/2011 | Moehlenbrock | |
| 2011/0038572 A1 | 2/2011 | Moehlenbrock | |
| 2011/0038573 A1 | 2/2011 | Moehlenbrock | |
| 2011/0060447 A1 | 3/2011 | McLaughlin et al. | |
| 2011/0094193 A1 | 4/2011 | Daelmans et al. | |

FOREIGN PATENT DOCUMENTS

| | | |
|---|---|---|
| EP | 1375351 B1 | 1/2004 |
| EP | 1394084 A | 3/2004 |
| EP | 1808482 A1 | 7/2007 |
| EP | 1026077 | 5/2008 |
| EP | 1927463 A1 | 6/2008 |
| FR | 2905121 B | 9/2010 |
| GB | 2054512 A | 2/1981 |
| GB | 2089311 A | 6/1982 |
| GB | 2165202 A | 4/1986 |
| GB | 2246998 | 2/1992 |
| IN | 237423 | 2/2006 |
| JP | 54-165263 U | 11/1979 |
| JP | H04583 B2 | 1/1992 |
| JP | 2001240004 A | 9/2001 |
| JP | 2003231590 A | 8/2003 |
| JP | 2005343473 | 12/2005 |
| JP | 2008207830 A2 | 9/2008 |
| WO | WO 9842576 | 10/1998 |
| WO | WO 01/79416 A1 | 10/2001 |
| WO | WO 02/42408 A2 | 5/2002 |
| WO | WO 2003026999 | 4/2003 |
| WO | WO 2004/033301 A1 | 4/2004 |
| WO | WO 2010/136282 A1 | 2/2010 |
| WO | WO 2010/066509 A1 | 6/2010 |
| WO | WO 2010/140242 A1 | 12/2010 |

OTHER PUBLICATIONS

U.S. Appl. No. 14/028,877, filed Sep. 17, 2013, Eric Shawn Goudy.
International search report dated Apr. 26, 2013, 8 pages.
International search report dated May 13, 2013, 4 pages.

* cited by examiner

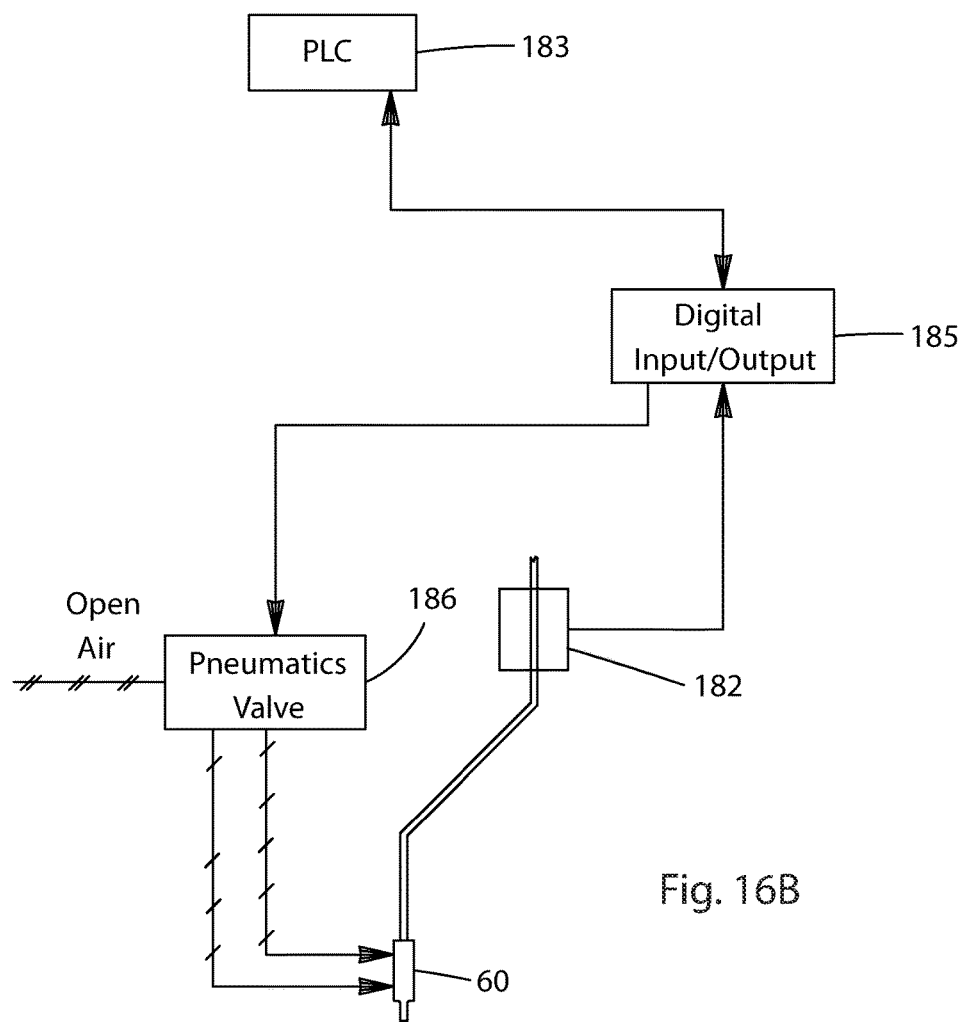

METHOD FOR FORMING PACKAGES

FIELD OF THE INVENTION

A method and apparatus for formation, filling, and sealing unit dose packages for consumer products are described herein. A filling system with a filling control system is also disclosed.

BACKGROUND OF THE INVENTION

Unit doses of liquid products such as shampoo and hair conditioner are often placed in relatively thin, flat packages known as sachets. Such sachets are typically provided with water vapor barrier properties to prevent water loss from the product in the package over time. Sachets of this type are generally made using vertical forming, filling and sealing (VFFS) processes.

Current processes exist for vertical forming, filling and sealing, both intermittently and continuously. Vertical forming, filling and sealing (VFFS) processes typically employ one set of fill nozzles that are inserted in between two layers of material used to form the package. The nozzles must turn on and shut off after filling each package. For intermittent motion processes, filling occurs while the film or packaging material is in motion, and the film stops during the sealing process. Even for continuous processes, where all operations are performed on moving webs, rates become limited by the filling process. The ability to accurately dispense the desired amount of liquid in extremely short dispensing cycle times is needed.

Processes also exist for horizontal forming, filling, and sealing. Examples of horizontal forming, filling, and sealing processes are described in PCT Publication WO 2004/033301 A1, Smith, et al.; US. Patent Application Publication US 2005/0183394 A1; and EP 1 375 351 B1, Lauretis, et al. Some of such processes may involve thermoforming a portion of the packaging material.

The search for improved package forming processes and filling systems has, however, continued. In particular, there is a need for faster processes for producing sachets, especially sachets that comprise films made with vapor barriers that cannot be thermoformed without disrupting the vapor barrier.

SUMMARY OF THE INVENTION

A method and apparatus for formation, filling, and sealing unit dose packages for consumer products are described herein.

In one embodiment, the method comprises a process for making a package comprising the steps of:
a) placing a first web of material having an original un-deflected configuration adjacent to an element having a cavity therein;
b) temporarily deflecting a portion of the first web of material downward into the cavity to form a deflected portion of said first web of material, wherein said deflected portion of said first web of material is substantially free of plastic deformation;
c) depositing a product onto the first web of material;
d) placing a second web of material over the first web of material and the product; and
e) at least partially closing and sealing the first web of material having the deflected portion therein to said second web of material along one or more sealing lines.

In one embodiment, the apparatus comprises a first infeed zone for receiving a supply of a first web of material and an element having a cavity therein. The element having the cavity therein is located downstream of the first infeed zone. A portion of a first web of material may be temporarily deflected into the cavity. The cavity comprises a base and a pair of side walls. In this embodiment, the element having the cavity therein comprises a moving belt having a surface, and the belt moves in a machine direction, wherein the surface of the belt forms a base of the cavity, and the element further comprises longitudinal side edge portions that form side walls of the cavity. The apparatus may further comprise a dispensing device for applying a product onto the portion of the first web of material that overlies the cavity. The dispensing device is located in a dispensing zone above the element having a cavity therein. The apparatus may further comprise a second infeed zone for receiving a supply of a second web of material. The second infeed zone may be located downstream of the dispensing device, wherein a second web of material may be disposed to overlie the first web of material with the product thereon. The apparatus may further comprise a sealing device located downstream of the second infeed zone for sealing a first and second web of material together with a product therebetween.

A filling system with a filling control system is also disclosed. The filling system and filling control system can be used in the method described herein, as well as in other dispensing processes, and may comprise inventions in their own right.

BRIEF DESCRIPTION OF THE DRAWINGS

FIG. 16B is a schematic diagram of an alternative filling control system.

DETAILED DESCRIPTION OF THE INVENTION

A method and apparatus for formation, filling, and sealing unit dose packages for consumer products are described herein. A filling system with a filling control system is also disclosed. Although the filling system is described in conjunction with a method for forming, filling, and sealing unit dose packages, the filling system and filling control system can be used in other dispensing processes.

The unit dose package can be in any suitable configuration. The contents of the package can be in any suitable form including, but not limited to, solids, liquids, pastes, and powders. The term "fluid" may be used herein to include both liquids and pastes.

In certain embodiments, the unit dose packages comprise sachets that are filled with products which may include personal care products or household care products including, but not limited to: shampoo, hair conditioners, hair colorants (dyes and/or developers), laundry detergents, fabric softeners, dishwashing detergents, and tooth paste. The sachets can contain other types of products including, but not limited to food products such as ketchup, mustard, mayonnaise, and orange juice. Such sachets are typically relatively thin and flat, and in some cases, are provided with water vapor barrier properties to prevent water loss from the product in the package over time, or water intrusion into the product from outside the package.

Figure 1:
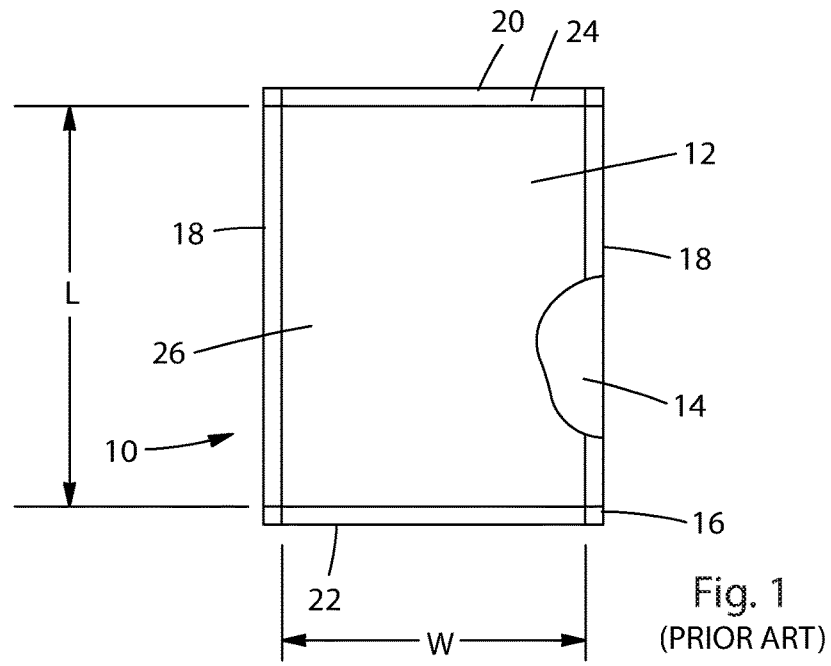
FIG. 1 is a schematic front view of one embodiment of a sachet.

FIG. 1 shows one non-limiting example of a sachet 10 that is in the form of a prior art sachet. The sachet 10 has a front 12, a back 14, a periphery 16, two sides 18, a top 20, and a bottom 22. The sachet 10 further has a seal 24 around the periphery. The sachet may be in any suitable configuration including, but not limited to the rectangular shape shown.

The sachet may have any suitable dimensions. In one embodiment, the sachet is 48 mm×70 mm, and has a sealed area that is 5 mm in width around all four sides. The dimensions of the pocket 26 inside the sachet (width W and length L) are 38 mm×60 mm.

The package, such as sachet 10, can be made of any suitable materials. Suitable package materials include films, and woven or nonwoven materials (in cases where the sachet contains a solid product), or laminates of any of the foregoing. If desired, the package material can comprise a liquid and/or vapor barrier in the form of a layer or a coating. The package materials may be comprised of non-water soluble materials, or for some uses, water soluble materials. The various portions of the sachet (or other type of package) can all be made of the same materials. In other embodiments, different portions of the package can be made of different materials. In one embodiment, the sachet 10 is made of two pieces of the same film that form the front 12 and back 14 of the sachet. The film can be any suitable type of film including single layer films and laminates.

The elastic modulus of the package material for a sachet may range from greater than or equal to about 1,000 N/m (such as for a low density polyethylene nonwoven) up to about 90,000 N/m for films and laminates comprising films. The elastic modulus of the package material may fall within any narrower range that falls within the above range. For example, in some embodiments of films and laminates comprising films, the elastic modulus may range from about 45,000 to about 85,000 N/m.

In one embodiment, the package material is a laminate comprising the following three layers: a 9 micron thick polyethylene terephthalate (PET) film; an 18 micron thick vacuum metalized bi-axially oriented polypropylene (VM BOPP) vapor barrier film; and a 30-50 micron thick polyethylene (PE) film. The PET and PE layers are adhered to the VM BOPP film by adhesives. In this film, the PET layer will comprise the outside surface of the sachet, and the polyethylene layer will comprise a sealing layer on the inside of the sachet. The water vapor barrier properties for this film are important to prevent water loss from the product inside the sachet over time before it is used by the consumer. The film has a target water vapor transmission rate of less than or equal to about 0.4 grams/$m^2$/day. The average machine direction modulus of this laminate film is about 63,000 N/m, and the average cross-machine direction modulus is about 75,000 N/m.

Figure 2:
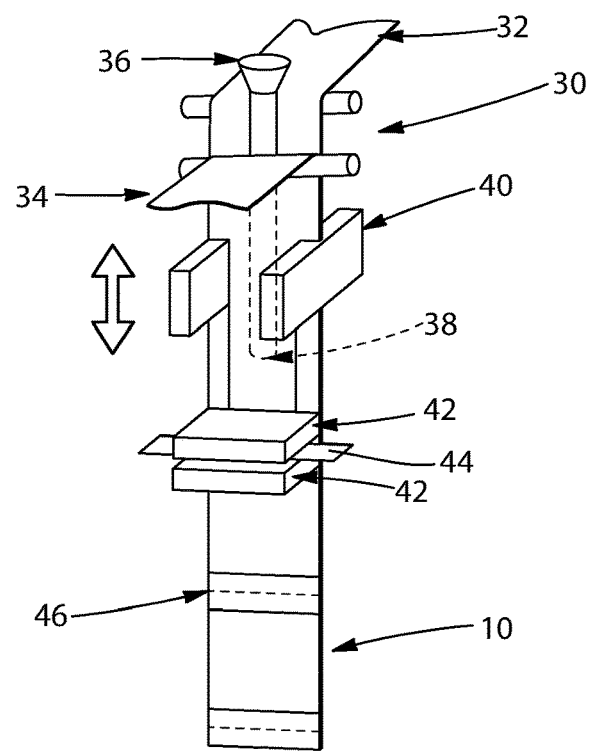
FIG. 2 is a schematic perspective view of a vertical forming, filling, and sealing process.

FIG. 2 shows a vertical form, fill, and seal (VFFS) process and apparatus 30 for making sachets. As shown in FIG. 2, two webs of material 32 and 34 for forming the sachets are brought into the apparatus, and are fed into the process in a vertically downward direction. A filling nozzle 36 is inserted between the webs 32 and 34. The tip 38 of the filling nozzle 36 (the view of which is obstructed by the second web 34) is located by the tip of the arrow 38. Vertical seals are formed along the sides of the webs 32 and 34 by vertical sealing mechanisms 40. A cross sealing mechanism 42 is located below the tip 38 of the filling nozzle 36. The cross sealing mechanism 42 forms the seal that is located at the top of one sachet and the bottom of the next sachet. A perforation or cutting mechanism 44 is located below the cross sealing mechanism 42, and forms perforations 46 through the seal formed by the cross sealing mechanism 42. A finished package or sachet 10 is shown at the bottom of FIG. 2.

The simplified version of the apparatus 30 shown in FIG. 2 is only a single lane (one package width) wide. It is known to provide such apparatuses with multiple side-by-side vertical lanes. However, even in such multiple lane apparatuses, due to the configuration of the vertical forming, filling and sealing process, each lane will only have a single fill nozzle. The product flow, whether liquid or powder, must be shut off cleanly so as not to contaminate the sealing of the package. The ability for one set of fill nozzles, which are inserted in between the two layers of material 32 and 34, to turn on and shut off cleanly is a speed limiter.

Figure 3:
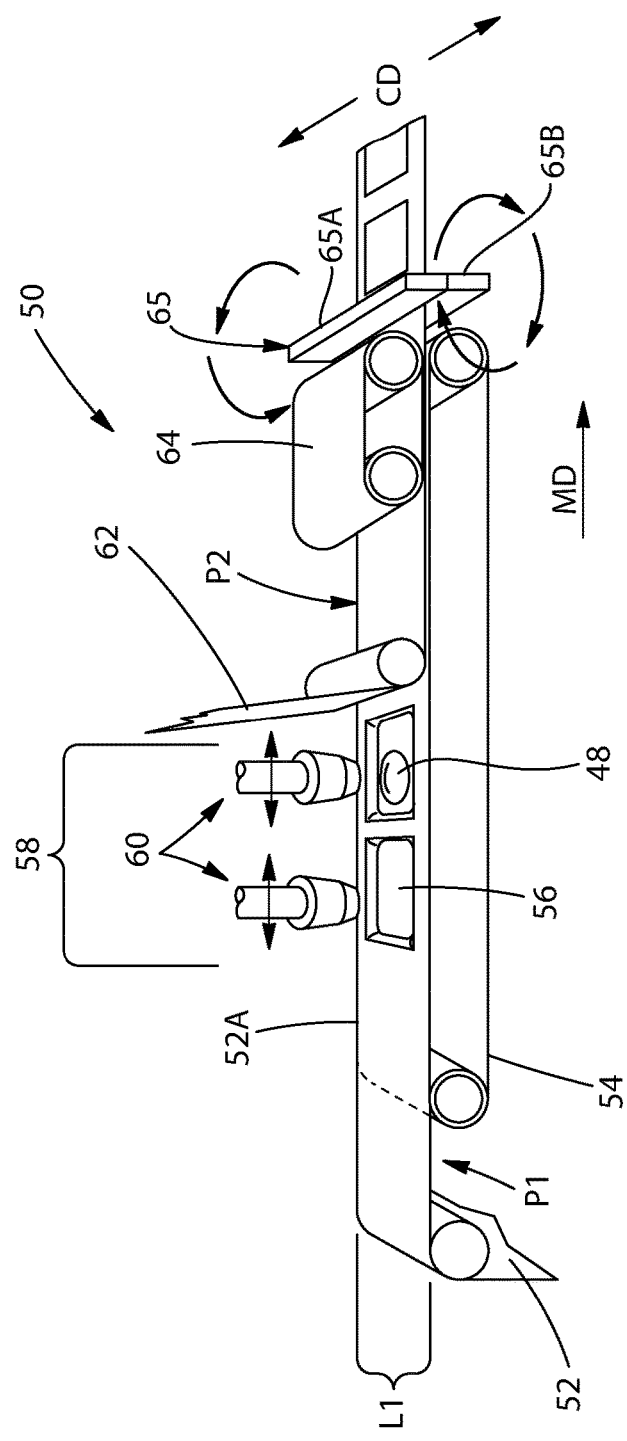
FIG. 3 is a schematic perspective view of one embodiment of a method and apparatus for forming a package.

FIG. 3 shows a simplified single lane L1 version of a new forming, filling, and sealing process and apparatus 50. The process can be described as a horizontal form, fill and seal (HFFS) process. In the embodiment shown, the process and apparatus 50 is used to form sachets containing liquid products. The process, however, is not limited to forming sachets (or sachets containing liquid products). In essence, in one embodiment of this process, a first or lower web of material (such as a film) 52 is fed into the apparatus 50, and may then be transported in a generally horizontal orientation. The first web of material 52 is transported over a first or lower element having at least one cavity 56 therein into which a portion of the first web 52 is temporarily deflected. A product 48 is deposited onto the first web of material 52, such as by nozzles 60. The first web of material is then covered with a second, or upper web of material 62, and the two webs are sealed together to form the sachets. The components of the apparatus 50, and variations thereof, are as follows.

The first web of material 52 is transported by a conveyor (which in this case is the first element, and which may be referred to as a "lower conveyor", or "filling conveyor") 54. The lower conveyor 54 may be any suitable type of conveyor, including but not limited to a vacuum conveyor. The lower conveyor 54 has a profiled surface that forms at least one pocket or cavity 56 in the surface of the lower conveyor 54 into which portions of the first web of material 52 are deflected. In this embodiment, the lower conveyor has a plurality of cavities 56 formed therein.

The first web of material 52 has an original un-deflected configuration. The first web of material 52 is maintained under tension in the process of conveying it through the apparatus. The first web of material 52 may be conveyed by the lower conveyor 54 in a continuous motion. In other embodiments, the first web of material 52 may be conveyed in an intermittent motion. The first web of material 52 may, in various embodiments, may be moved at substantially the same speed as the lower conveyor 54, at a lesser speed than the lower conveyor, or at a greater speed than the lower conveyor 54.

The cavity 56 may be in any suitable configuration. The embodiment of the apparatus shown in FIG. 3 forms discrete pockets for each dose of product 48 that will be contained inside the sachets. It should be understood, however, that in some cases, it is not necessary to form discrete pockets for each dose of product 48 that will be contained inside the sachets. In other embodiments, for example, the cavity 56 may be in the form of a continuous trough. The configuration of the cavity 56 formed by the lower conveyor 54 determines the shape or configuration of the lower web of material 52. (Although the description which follows may describe the first web of material 52 as a film, it is understood that the first web of material 52 is not limited to a film.) The lower web of material 52 can be shaped in the cross-machine direction (or "CD"), and optionally also in the machine direction (or "MD"). The configuration into which the lower web of material 52 can be shaped depends on the modulus of the material comprising the lower web of material 52 and the properties of the product 48 to be filled.

Figure 4:
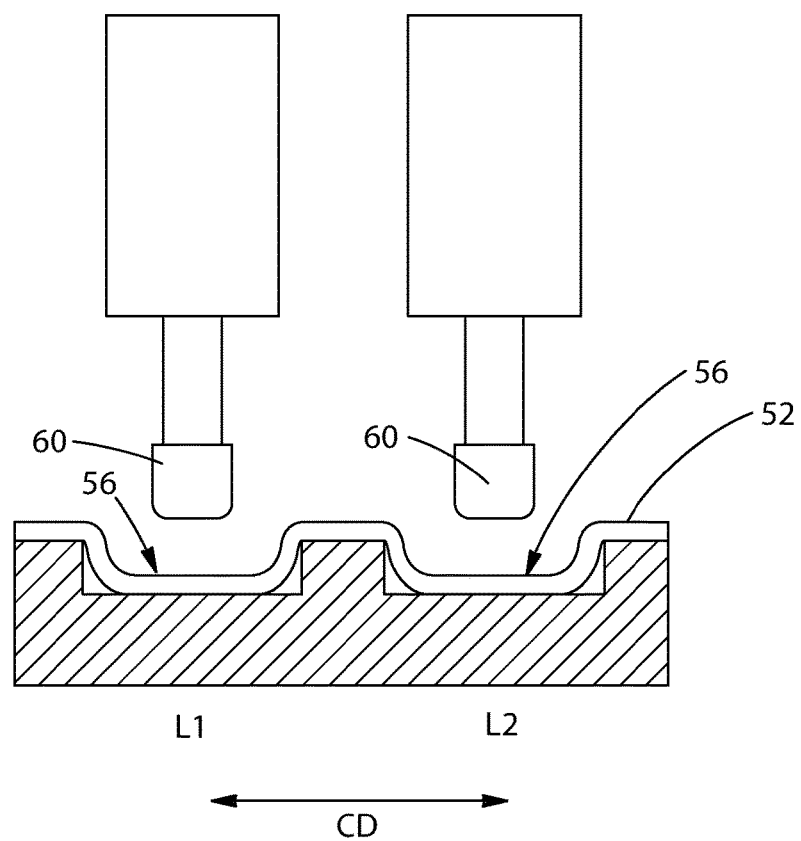
FIG. 4 is a schematic cross-sectional view of a portion of an apparatus having two side-by-side lanes for forming packages, with a filling nozzle for each lane.

FIG. 4 shows a simplified cross-section of the lower web of material 52 formation in an embodiment in which the process shown in FIG. 3 which is expanded to provide multiple lanes L1 and L2 in the cross-machine direction. This enables side-by-side rows of sachets to be produced from a single web of film (that is, a single lower web of material 52 and a single upper web of material described below). The apparatuses 50 described herein can comprise any suitable number of multiple lanes, from two to twelve, or more.

As shown in FIG. 4, a portion of the film 52 is caused to substantially fit into a cavity 56. This portion of the film 52 can be caused to substantially fit or be formed into the cavity 56 by any suitable mechanism. Suitable mechanisms include but are not limited to: (1) mechanically manipulating (or pre-forming) the film 52 before it enters the cavity so that it comprises a portion that more readily fits into the cavity 56; (2) by deflecting the portion of the film into a cavity 56 by exerting vacuum and/or air pressure on the film; or, (3) both. In still other embodiments, the film 52 can be caused to be formed into the cavity by the force of depositing the product 48 onto the film 52. Such mechanisms may, but need not, shape the film 52 so that it conforms exactly to the shape of the cavity 56.

If a mechanical pre-forming step is used, it will typically be located in the process prior to (or upstream of) the location where the first web of material 52 contacts the forming conveyor 54. For example, if such a pre-forming process were used in the apparatus 50 shown in FIG. 3, the mechanical pre-forming apparatus would be located at location P1 that is between the location where the first web of material 52 is fed into the apparatus and the upstream end of the forming conveyor 54.

Figure 5:
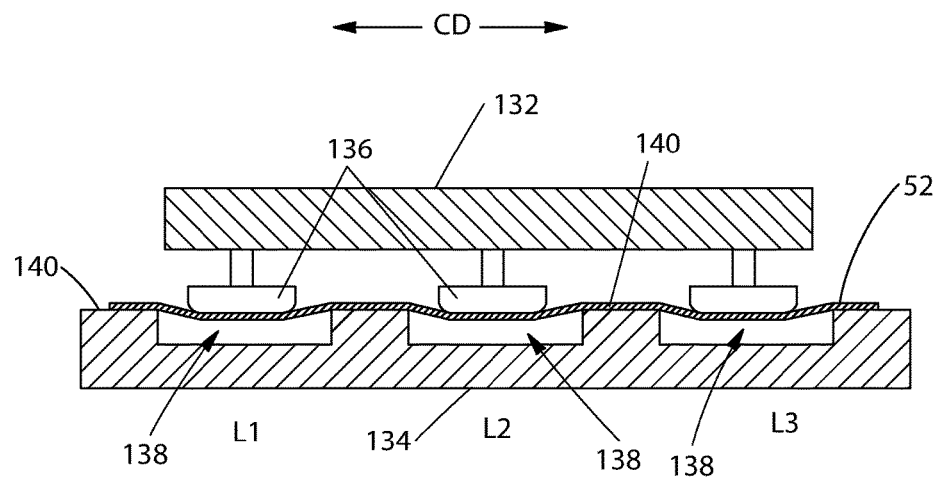
FIG. 5 is a schematic cross-sectional view of a portion of the apparatus for mechanically deflecting the lower web of material into cavities.
Figure 6:
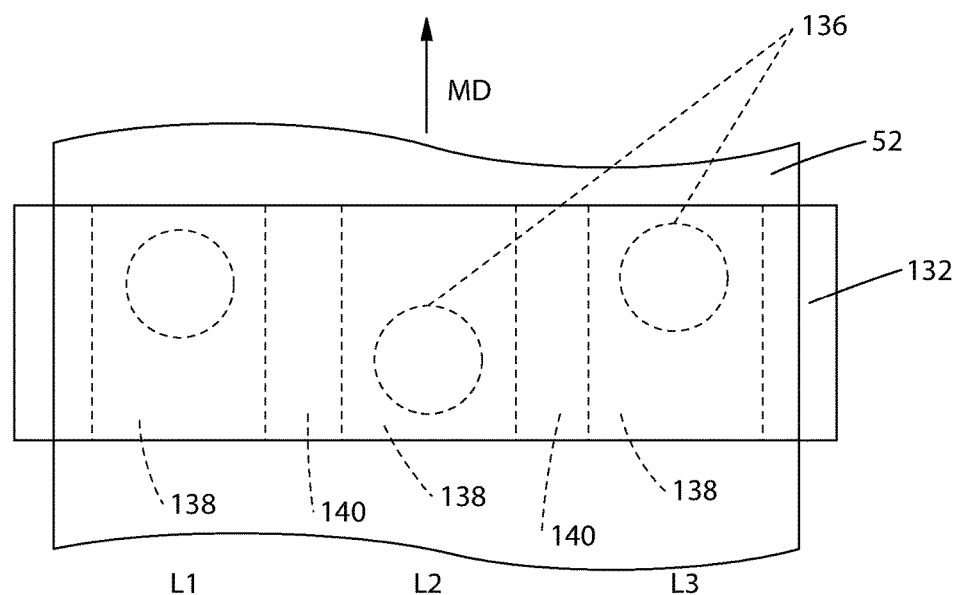
FIG. 6 is a schematic top view of the portion of the apparatus shown in FIG. 5.

Suitable mechanisms for mechanically manipulating the film include, but are not limited to rails, skis, balls, domes, or half rounds. FIGS. 5 and 6 show one embodiment comprising three side-by-side lanes, L1, L2, and L3, in which the film 52 is mechanically pre-formed to assist the film 52 in conforming to the shape of the cavities 56 by a combination of mechanical shaping components. In FIGS. 5 and 6, the mechanical shaping components are provided by a top forming plate 132 and a bottom forming plate 134. The bottom forming plate 134 comprises spaced apart channels 138 with machine direction-oriented rails 140 therebetween that are spaced apart in the cross machine direction and disposed below the film 52. The top forming plate 132 comprises spaced apart upper elements 136 that are disposed above the film 52. In this embodiment, the upper elements 136 comprise rounded elements such as domes or half rounds. The upper elements are aligned with the channels 138 in the bottom forming plate 134. In other embodiments, the positions of the mechanical shaping components may be reversed such that the channels 138 and rails 140 are on the top forming plate, and the domes 136 are on the bottom forming plate.

As shown in FIG. 6, in certain embodiments in which there are multiple CD lanes of products being formed, it may also be desirable for at least one of the elements in at least one of the lower or upper group of mechanical shaping components to be arranged so that the elements in or adjacent to the lanes in the middle of the forming conveyor are further upstream than the elements in, or adjacent to, the outer lanes. For instance, the upper elements, half rounds 136, could be arranged in a chevron configuration when viewed from above. This can make the forming of the web more gradual. In still other embodiments, it may be desirable for the mechanical shaping components in one of the lower or upper group of mechanical shaping components to have a leading edge that is upstream of the other mechanical shaping components in the opposing group.

Such mechanical forming mechanisms can be used alone, or in combination with vacuum mechanisms. For example, in some embodiments, the mechanical forming mechanism can pre-form the film 52 so that it is formed to substantially fit in the cavity 56, and vacuum can be used to more closely fit the portion of the film 52 into the cavity 56. In other embodiments, the mechanism can pre-form the film 52 so that it is formed to closely fit in the cavity 56, and vacuum is merely used to retain the portion of the film 52 in the cavity 56 during filling and sealing. In still other embodiments, such mechanical forming mechanisms could be omitted entirely, and the portion of the film 52 can be drawn into the cavity 56 using vacuum alone.

The depth of formation of the film 52 depends on the desired fill volume and material properties of the product being filled. The lower web of material 52 may be deflected, formed, or drawn into the cavity 56 at ambient temperature. The term ambient temperature, as used herein, refers to temperatures of less than about 100° F. (38° C.). Typically, the forming process may be carried out at temperatures of from about 40° F. (4° C.) to about 95° F. (35° C.), or from about 60° F. (15° C.) to about 80° F. (27° C.). However, depending on the film, it is also possible to form or draw the lower web of material 52 into the cavity at an elevated temperature. The film temperature can be elevated in any suitable manner, such as by heating the lower web of material 52 or by heating the cavity 56. In these, or other embodiments, the lower web of material 52 may also have heat indirectly applied thereto, such as due to the heat emitted from the heated sealing bars described herein.

Figure 7:
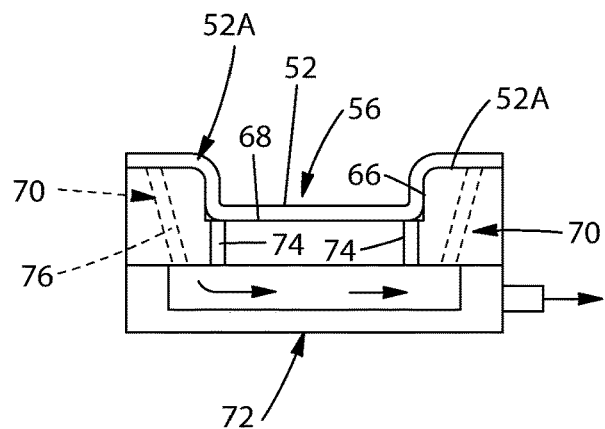
FIG. 7 is a schematic cross-sectional view of a portion of the apparatus for deflecting the lower web of material into a cavity.

There are various different types of mechanisms that can be used to form the cavities 56. These mechanisms can be used for a number of purposes, including to: deform the lower web of material 52 into the cavities 56; to retain a pre-formed lower web of material in the cavities; or both. FIG. 7 shows a simple execution of the step of deforming the lower web of material 52 (or retaining a pre-formed lower web of material in the cavities). In this embodiment, the lower web of material 52 is slid over a stationary component having a profiled shape, such as a plate with a profiled surface which has a cavity 56 therein. In this case, the cavity 56 is in the form of a continuous machine direction-oriented trough. The cavity 56 is defined by side walls 66 and a bottom 68. As shown in FIG. 7, the plate forming the cavity 56 has a plurality of vacuum channels 70 therein that are connected to a vacuum manifold 72. The vacuum channels 70 can be located along any suitable portion of the cavity 56 including, but not limited to the sides 66 and the bottom 68 of the cavity 56. In the embodiment shown, a first set of vacuum channels 74 is located at the location where the sides 66 and bottom 68 of the cavity meet. A second set of vacuum channels 76 can be located laterally outside the cavity 56, and can be used to hold down the edge portions 52A of the lower web of material 52.

Figure 8:
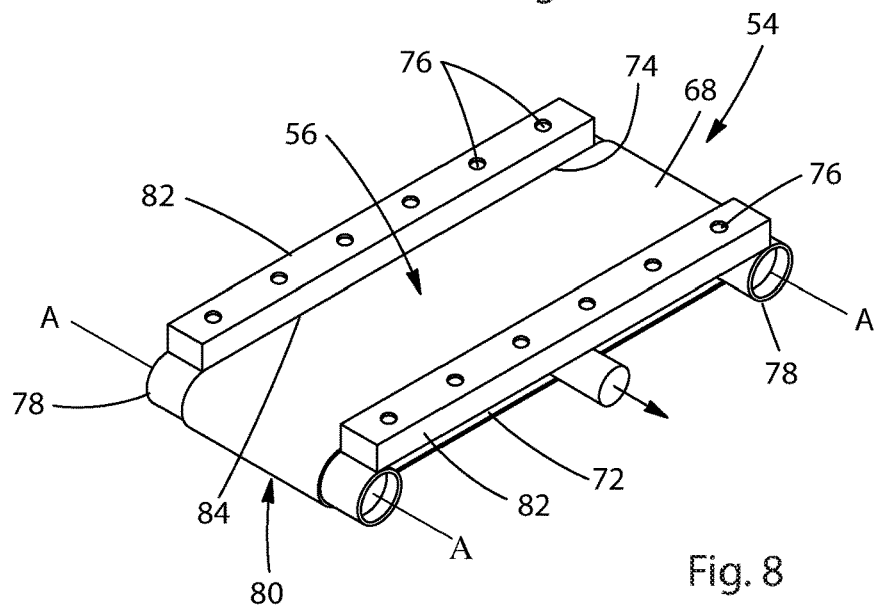
FIG. 8 is a schematic perspective view of an alternative embodiment of a portion of the apparatus for drawing the lower web of material into a cavity in which the bottom of the cavity is formed by a moving belt.

As shown in FIG. 8, in other embodiments, instead of a plate with a profiled surface, the apparatus may comprise a moving belt conveyor (or simply "moving belt") 80 that forms the bottom 68 of the cavity 56. The moving belt 80 may be in the form of a closed or endless loop. The belt 80 may be part of a conveyor system that comprises at least two rolls 78 around which the belt 80 travels. The rolls 78 may have a plurality of ridges and grooves running in the direction of the rotational axis A of the rolls. The belt 80 may have a plurality of cross machine direction-oriented ridges and grooves on its underside that are engaged by the ridges and grooves on the rolls 78 for driving the belt 80. In this embodiment, the bottom surface 68 of the cavity 56 is formed by the top surface of the moving belt 80, and side walls 66 are formed by stationary side rails 82. The stationary side rails 82 form a slight gap 84 with the moving belt 80 to accommodate the movement of the belt 80. In this embodiment, it is more desirable for the lower web of material 52 to move with the moving belt 80, rather than to slide across the same as in the case of the component shown in FIG. 7.

The embodiment shown in FIG. 8 also has a first set of vacuum channels 74 and a second set of vacuum channels 76. In the embodiment shown in FIG. 8, the openings of the first set of vacuum channels 74 are located at the location in the gap 84 between the side rails 82 and the moving belt 80. This deflects (or retains) the lower web of material 52 into the configuration of the cavity 56. The second set of vacuum channels 76 are formed in the side rails 82 as shown to hold down the edges of the lower web of material 52. In this embodiment, the vacuum manifold 72 may be located inside the conveyor 80.

Figure 9:
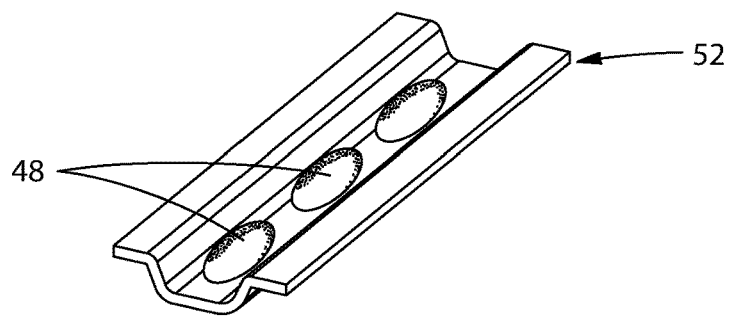
FIG. 9 is a schematic perspective view of the deformation of the lower web of material with doses of the product deposited thereon.

FIG. 9 shows that the lower web of material 52 can be formed into a trough, such as by the forming apparatus shown in either FIG. 7 or FIG. 8. The formation of the lower web of material 52 into a simple trough is adequate when the product comprises liquids of medium viscosity (such as shampoo) or high viscosity, such as hair conditioner. As shown in FIG. 9, the liquid 48 can be deposited in discrete amounts and will remain separated on the lower web of material 52 for extended periods of time.

Figure 10:
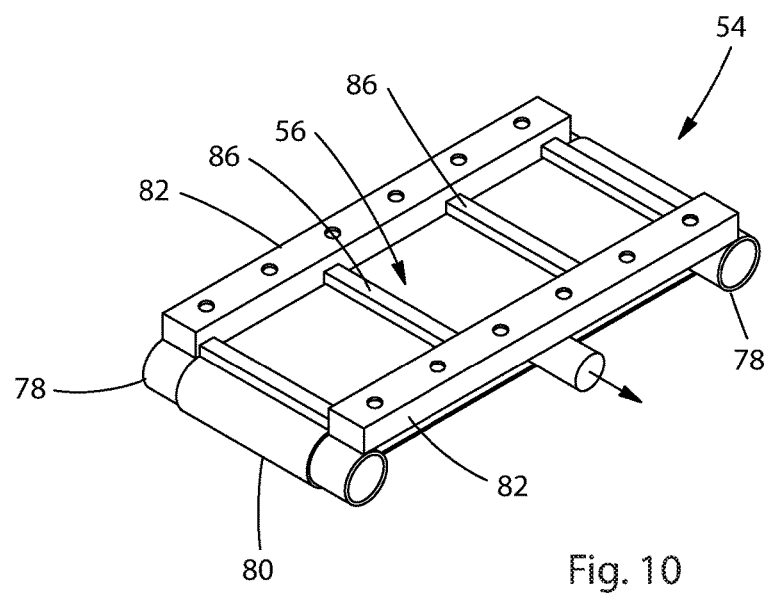
FIG. 10 is a schematic perspective view of an alternative embodiment of a portion of the apparatus for drawing the lower web of material into a cavity shown in FIG. 8 in which the cavity is formed into discrete pockets.

As shown in FIG. 10, in the case of less viscous liquids, like liquid household care detergents, cross-machine direction rails (or "cross members" or "cross rails") 86 can be added to the moving belt 80 to delineate discrete pockets 56. The cross rails 86 may be lower in height than the side rails 82 to minimize deformation of the lower web of material 52. The components of the moving belt conveyor 54 shown in FIG. 10 can have any suitable dimensions.

Figure 11:
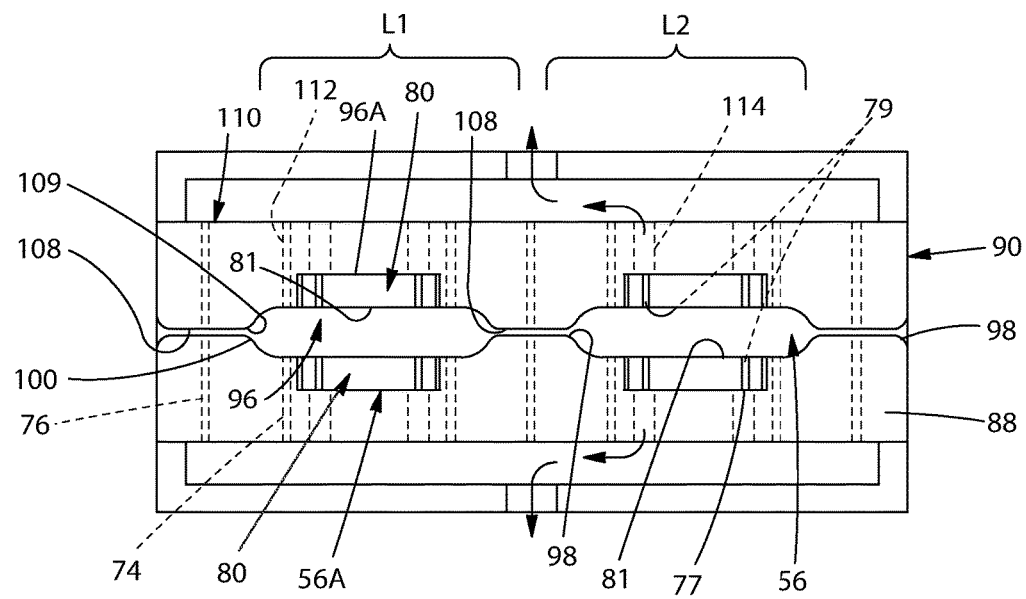
FIG. 11 is a schematic cross-section of another embodiment of a forming apparatus comprising both a bottom plate and a top plate, each including moving belts, for use in an apparatus that is two lanes wide.

FIG. 11 shows another embodiment of a forming apparatus. The forming apparatus in FIG. 11 comprises a combination of fixed plates and moving belts. The forming apparatus comprises a bottom plate 88 and a top plate 90 for use in a HFFS apparatus 50 that is two lanes wide. The bottom forming plate 88 is used to deflect the lower web 52 (or retain a pre-formed lower web in a deflected condition). The top forming plate 90 is used to deflect the upper web 62 (or retain a pre-formed upper web in a deflected condition). Although the top forming plate 90 is shown as being disposed directly over the bottom forming plate 88, it should be understood that the top forming plate 90 is typically located downstream of the bottom forming plate 88 after the dispensing zone 58. The top forming plate 90 will be further described after the description of the dispensing step.

The bottom forming plate 88 is contoured to provide cavities 56 therein. As shown in FIG. 11, the bottom plate 88 comprises raised surfaces 98 between, as well as laterally outside of, the cavities 56. In one non-limiting embodiment, the cavities 56 are 30 mm wide, and the raised surfaces 98 have a width of 14 mm. The raised surfaces 98 have longitudinal side edges 100 that are radiused to avoid tearing the lower web of material 52. The bottom forming plate 88 has spaced apart vacuum channels therein. There is a first set of vacuum channels 74 in the base of the cavities 56 adjacent each of the sides of the cavities. There is also a second set of vacuum channels 76 in the raised surfaces 98 that are laterally outside of the cavities 56. The vacuum channels 74 and 76 are spaced apart in the machine direction (such as about 10 mm). A moving belt 80 similar to that shown in FIG. 8 or FIG. 10 is located within each of the cavities 56, or in a recess 56A adjacent to, or within, each of the cavities 56. In FIG. 11, recesses 56A are formed into the bottom surfaces of the cavities 56. At least a portion of the bottom of the forming cavities 56 may be formed by the top surface 81 of the belts 80. Vacuum is used to form the web (or retain a pre-formed lower web in a deflected condition), and the belts 80 are used to transport the web 52 across the rigid, non-moving forming plates.

One difference between the belts shown in FIG. 11 and those shown in the prior figures is that in FIG. 11, there may be vacuum channels 77 leading to the top surfaces 81 of the belts 80. The belts 80 may have vacuum holes 79 therein for maintaining the web 52 in contact with the top surfaces 81 of the belts 80. In the embodiment shown in FIG. 11, the vacuum holes 79 are located along each longitudinal side portion of the belts 80, although in other embodiments, the vacuum holes can be located elsewhere in the belts, such as along the sides of the belt as shown in FIG. 8. In still other versions of this embodiment, the belt 80 may have adequate traction to drive the film 52 without vacuum being applied to the belt 80 if the top surface 81 of the belt 80 is raised above (e.g., 0.125 mm above) the base of the forming cavity.

In embodiments in which the films are primarily preformed or shaped by a mechanical apparatus to deflect the same, the lower web of material 52 can be adequately retained in the cavities 56 with about 30 inches (76.2 cm) of water vacuum. In other embodiments, the films are primarily shaped by vacuum. In the latter embodiments, if the apparatus is twelve lanes wide, the portions of the lower web of material in the center six lanes can be formed with 25-35 inches (about 65 cm to 90 cm) of vacuum. The portions of the lower web of material 52 in the outer three lanes on each side of the center lanes can be formed with between about 15 to 25 inches (about 38 to 65 cm) of vacuum.

At least a portion of the lower web of material 52 that is deflected or formed into the cavity 56 will undergo elastic deformation. The amount of elastic deformation is desirably less than or equal to the maximum strain of any vapor barrier associated with the first web of material 52. The amount of elastic deformation may, for example, be less than or equal to about 4%, 5%, or 6%.

In at least some embodiments, it is desirable that the web of film 52 be substantially free of plastic deformation so that the film 52 tends to return back toward its original configuration after the mechanisms are finished acting on the film 52. The phrase "substantially free of plastic deformation", as used herein, refers to plastic deformation of less than or equal to about 1%. In some cases, it may be desirable for there to be less than or equal to about 0.5%, or less than or equal to about 0.2% plastic deformation. The lower web of material 52 may be completely free of plastic deformation. In embodiments in which the film 52 is substantially free of plastic deformation, the formed portion of the film 52 will typically be free of any macroscopically visible fold lines, creases, permanently stretched regions, or thinned regions. Of course, in other embodiments, it is possible for the film to contain some amount of plastic deformation. However, if the first web of material 52 contains a vapor barrier that would be undesirably disrupted by such plastic deformation, then such plastic deformation should be avoided. As described in more detail below, in addition to preserving the vapor barrier properties of the film 52, ensuring that the film is substantially free of plastic deformation will minimize any stretching of the film that may cause the width of the film to increase excessively. If the width of the film increases excessively, the edges of the lower web of material 52 may extend beyond the edges of the upper web of material 62 (or vice versa). This may require that the edges of one of the films be trimmed so that they coincide.

When the lower web of material 52 is deflected into the cavities 56, the side edges 52A of the lower web of material 52 are drawn inward so that the film 52 becomes narrower as a result of the deflection. In case of the conveyor 54 shown in FIG. 10 (for example), a film width reduction of about 2 mm may occur. The overall reduction in the width of the lower web of material 52 will be greater if there are two or more side-by-side lanes of pockets 56 for forming the sachets from a single web of film. For example, in the case of a lower web of material 52 that has an initial width of 96 mm, for a two lane execution, the film 52 may have a reduction in width of about 4 mm so that the deflected film width is about 92 mm wide. In the case of one example of a twelve lane execution, the lower web of material 52 may have an initial width of 585 mm, or more.

A variety of different methods and mechanisms can be used so that the lower web of material 52 can be deflected and undergo a reduction in width while the edge portions 52A of the lower web of material 52 remain held down by the vacuum. In one embodiment, the vacuum can be applied successively initially to the center portion (across the width) of the film 52, and then to the outer portions along the edges of the web of material. In such an embodiment, or in other embodiments, a higher vacuum can be applied to the center portion of the film 52 than to the outer portions along the edges of the film. In still other embodiments, the lower web of material 52 can be mechanically shaped or pre-formed, as described above before the film enters the cavities 56 so that the edges thereof are drawn inward in the desired amount before the vacuum is applied.

Figure 13:
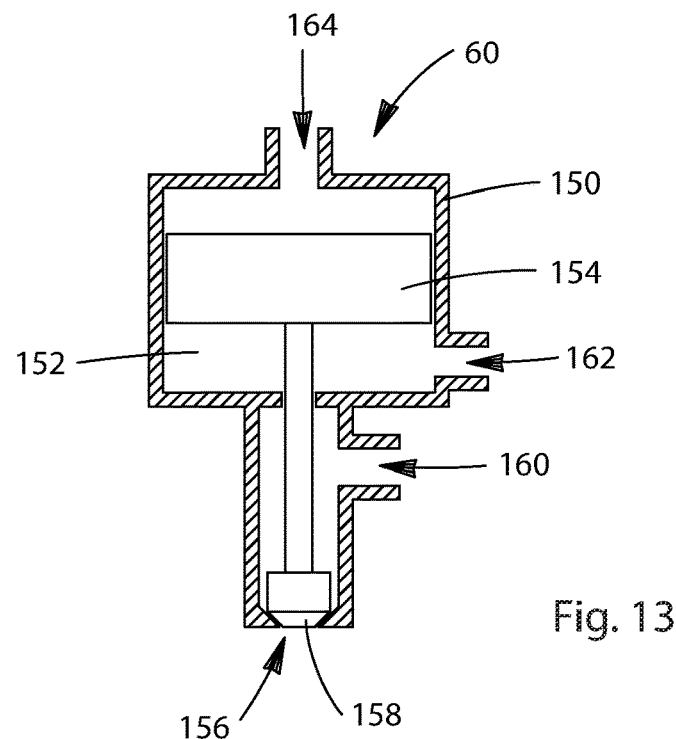
FIG. 13 is a cross-sectional view of a nozzle for use in the filling system.
Figure 14:
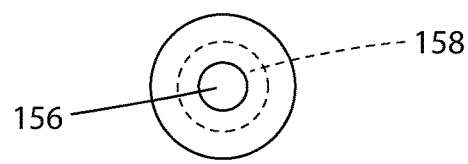
FIG. 14 is a schematic perspective view of the end of a nozzle having a circular orifice and shut off mechanism.

As shown in FIGS. 3 and 4, the product 48 can be deposited on the lower web of material 52 with any suitable dispensing device or apparatus including, but not limited to nozzles 60, positive displacement pumps, and devices for dispensing solids or powders, depending on the product to be dispensed. Although the following description describes nozzles, other dispensing devices may be used instead. The nozzles 60 are positioned above the lower web of film 52 in a dispensing zone 58. The nozzles 60 may dispense a product such as a liquid (or paste) product 48 onto the lower web of film 52, and specifically into the deflected portions on the lower web of film 52 that correspond to the cavities 56. The nozzle 60, and the orifice thereof, can be of any suitable type and configuration. FIG. 13 shows one suitable nozzle configuration. The nozzle 60 comprises a nozzle body 150, a chamber 152 having a piston 154 therein, a nozzle orifice 156, and a shut off mechanism or poppet 158. The nozzle body 150 has several openings therein, including: an inlet 160 for the liquid product 48; an inlet 162 for air to open the piston chamber 152, and an inlet 164 for air to close the piston chamber 152. The nozzle 60 may have a circular orifice as shown in FIG. 14. One suitable nozzle is a Hibar HPS 1.375 inch (3.5 cm) circular orifice positive shut off nozzle, part number 147742 having an inside diameter of ¼ inch (6.4 mm) available from Hibar Systems Limited of Boone, N.C., U.S.A.

Figure 15:
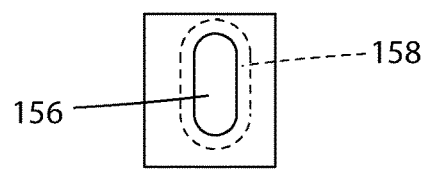
FIG. 15 is a schematic perspective view of the end of a nozzle having a slot shaped orifice and shut off mechanism.

FIG. 15 shows that in another embodiment, the nozzle may have a slot-shaped orifice. This can be used to deposit a lower profile (or height) dose of liquid on the lower web of material 52 than nozzles having a round orifice, which deposit raised beads of liquid. In some embodiments in which a slot-shaped nozzle 60 is used, the nozzle will deposit a relatively flat ribbon of liquid onto the lower web of material 52. The ribbon of liquid may be of any suitable plan view configuration, including but not limited to in a generally rectangular configuration. The slot-shaped nozzle 60 is disposed above the lower web of material 52 with its longer dimension oriented in the cross-machine direction and its shorter dimension oriented in the machine direction. The orifice may have any suitable dimensions. In one embodiment, the slot may be 25 mm long and 1.1 mm wide. As shown in FIG. 15, the nozzle 60 may comprise a shut off mechanism 158 that is the same shape as the shape of the slot 156 in order to cut off flow from the nozzle.

Figures 21, 22:
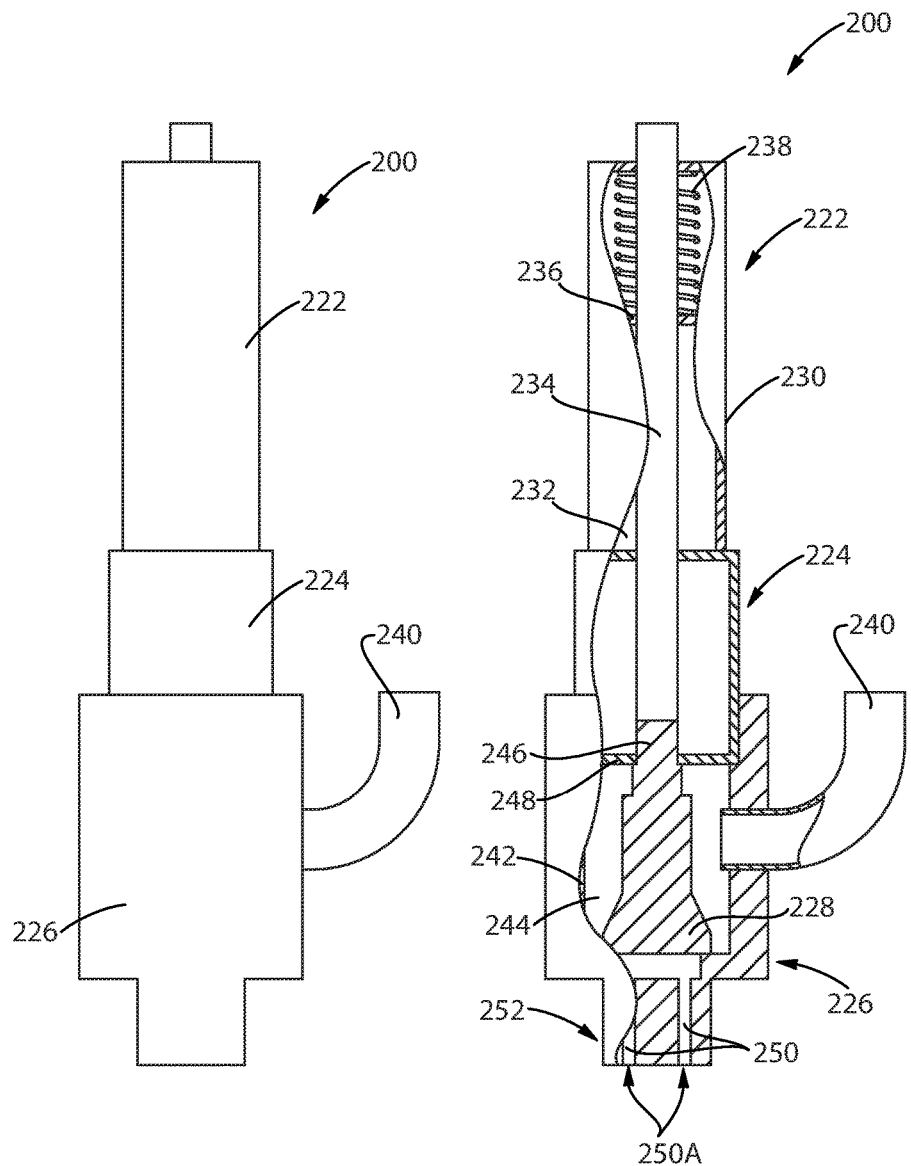
FIG. 21 is a schematic side view of another embodiment of a filling nozzle.
FIG. 22 is a partially cut away view of the filling nozzle shown in FIG. 21.

In other embodiments, the nozzle may have multiple orifices. That is, the nozzle may be a multiple-hole or "multi-hole" nozzle. Examples of multi-hole nozzles are described in provisional U.S. Patent Application No. 61/713,696 filed Oct. 15, 2012. Such a multi-hole nozzle is shown in FIGS. 21 and 22. FIG. 21 shows that the multi-hole nozzle assembly 200 may generally comprise an air cylinder 222, an optional connecting body 224, and a nozzle body 226. The air cylinder 222 moves the stopper 228 inside the nozzle body 226 to open and close the nozzle. The optional connecting body 224 connects the air cylinder 222 to the nozzle body 226. FIG. 22 shows that the air cylinder 222 may comprise a housing 230 having an interior hollow space 232 therein. The air cylinder 222 further comprises a rod 234, a piston 236, and a spring 238. In its usual orientation, during operation, the air cylinder 222 will move the rod 234 upward in order to open the nozzle, and downward to close the nozzle. The spring 238 holds the stopper 228 against the openings in the nozzle body 226 and keeps liquid from running out of the nozzle in the event air pressure to the filling machine is turned off (for an emergency, maintenance, air tubing failure, etc). The air cylinder 222 may comprise any suitable commercially available air cylinder. The optional connecting body 224 can comprise an element of any configuration that is suitable for connecting the air cylinder 222 to the nozzle body 226.

Figure 23:
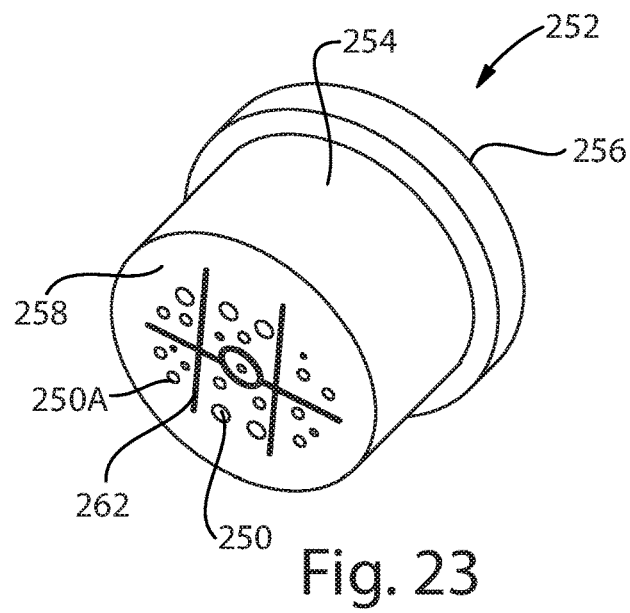
FIG. 23 is a perspective view of one embodiment of a nozzle component for the nozzle shown in FIGS. 21 and 22.
Figure 24:
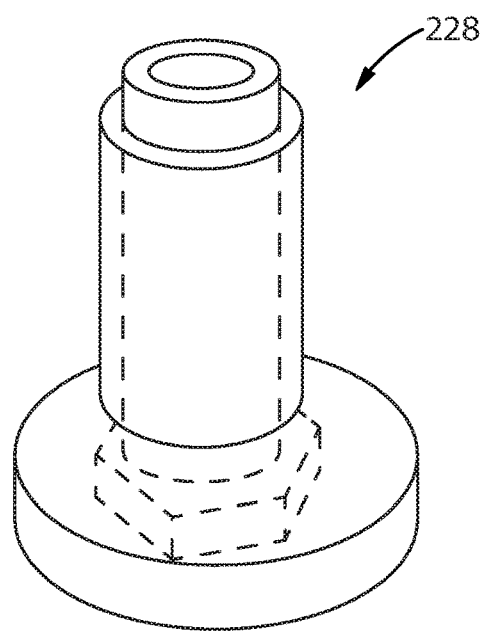
FIG. 24 is a perspective view of one embodiment of a stopper for the filling nozzle shown in FIGS. 21 and 22.

The multi-hole nozzle assembly 200 may comprise a nozzle component 252. The nozzle component 252 comprises either the portion of the nozzle body 226 that has passageways therein; or a separate nozzle piece that has passageways formed therein. One embodiment of a nozzle component 252 in the form of a separate nozzle piece is shown in FIG. 23. The nozzle component 252 has a periphery 254, an inlet side 256 having a surface, and an outlet side 258 having a surface. The nozzle component 252 has a plurality of separate passageways 250 extending through the nozzle component from adjacent its inlet side 256 to its outlet side 258 so that the passageways 250 form a plurality of openings 250A in the surface of the outlet side 258 of the nozzle component 252. In one embodiment, the surface of the outlet side 258 of the nozzle component 252 has a plurality of grooves 262 therein that are disposed to run between the openings 250A in the surface of the outlet side 258 of the nozzle component. The nozzle may further comprise a stopper 228 that can be of any suitable configuration, and can be made of any suitable material(s). In the embodiment shown in FIGS. 21 and 24, the stopper 228 is configured to have a substantially flat distal end that is large enough to simultaneously cover all of the opening(s) 250A formed by the passageways in the inlet side of the nozzle body. The stopper can be made of any suitable material, such as stainless steel.

Although the discharge end of the "multi-hole" nozzle assembly and nozzle component are shown as having a circular cross-section in the drawings, the discharge end of the nozzle assembly and nozzle component may have any suitable configuration(s). For example, when the multi-hole nozzle is used in a vertical forming, filling and sealing process, it may be desirable for the discharge end of the multi-hole nozzle to have a flattened shape, such as a flattened diamond shape, so that it is better configured to fit in the space between the two webs of material used to form the packages.

There can be any suitable number of nozzles 60 from a single nozzle to multiple nozzles. It is typically desirable to have two or more nozzles 60 arranged in the machine direction (MD) in each lane of sachets as shown in FIG. 3 to fill multiple packages in a single lane at the same time. This can greatly increase the speed of filling relative to a VFFS apparatus such as that shown in FIG. 2. As shown in FIG. 4, multiple nozzles can also be provided in the cross-machine direction (CD) in an apparatus that comprises multiple CD lanes for forming packages. The multiple nozzles 60 can be substantially aligned, such as in rows in both the MD and CD.

The nozzles 60 may be stationary or movable. In certain embodiments, the nozzles 60 may move relative to the receptacle. The "receptacle" comprises the article onto, or into which the fluid is to be dispensed. The term "into" as used herein with reference to dispensing includes dispensing both onto and into receptacles, whichever is appropriate for properly dispensing the fluid. The receptacle may comprise any type of article including, but not limited to the cavities in the lower web of material 52, or any type of container that is filled with a fluid, including bottles and other types of containers that contain more than a single dose of product. Although, the movement of the nozzles 60 will be described herein with relation to dispensing fluid into the cavities in the lower web of material 52, the features of the nozzles and the filling system are applicable to any other type of receptacle.

The nozzles 60 may be moveable in a reciprocating manner, for instance, such that they move in the same MD direction with the cavities 56 and then return to their starting position for the next dispensing cycle. In embodiments where the nozzles 60 are movable, the nozzles may, but need not be, completely synchronized to move at the same speed as the lower web of material 52. For example, the nozzles 60 may move at the same speed as the lower web of material 52, or they may move slower than the lower web of material 52. The nozzles 60 may move at a constant speed or at a variable speed during dosing. If the speed of the nozzles is variable, the movement of the nozzles may accelerate or decelerate during dosing. For instance, it may be desirable for the movement of the nozzles to decelerate so that the product dose will have as low and uniform height (or profile) as possible. This will help prevent the product from being dispensed or flowing into the portions of the webs that will be sealed together. If the nozzles 60 are movable, the nozzles 60 may dispense the product 48 at any of the following times: when the nozzles 60 are stationary; when the nozzles 60 are moving in the same direction and at the same speed as the lower web of material 52; when the nozzles 60 are moving in the same direction, but at a different speed than the lower web of material 52; or, when the nozzles 60 are moving in the opposite direction as the lower web of material 52. Using the motion and fill control system described herein, the nozzles 60 can be moved in a custom motion profile during the fill sequence to control the shape of the deposit on the receptacle.

The moveable nozzle mechanism and the filling system described herein can be used in the method described herein, as well as in other dispensing processes. Such other dispensing processes include, but are not limited to: vertical forming, filling and sealing (VFFS) processes; and filling processes for any type of container that is filled with a fluid, including those that are used to fill bottles and other types of containers that contain more than a single dose of product. The filling system described herein, thus, is not limited to filling the unit dose packages of the types described herein. As shown in FIG. 2, if the moveable nozzle mechanism is used in a vertical forming, filling and sealing (VFFS) process, the nozzles would move vertically upward and downward in the direction of the arrow.

It is desirable for each dose of liquid to be dispensed cleanly onto or into the receptacle, such as the lower web of material 52, and to substantially immediately stop the flow of liquid between doses. If the dispensing nozzle 60 drips or produces product strings between doses, the seal area between doses can be contaminated potentially causing a failure of the seal and a leaky sachet. Control of the dosing is accomplished by using a filling system or fill control system. The filling (or dosing) system with a filling control system (together with/or without the moveable nozzle mechanism) described herein can also be used in such other dispensing processes.

Figure 16:
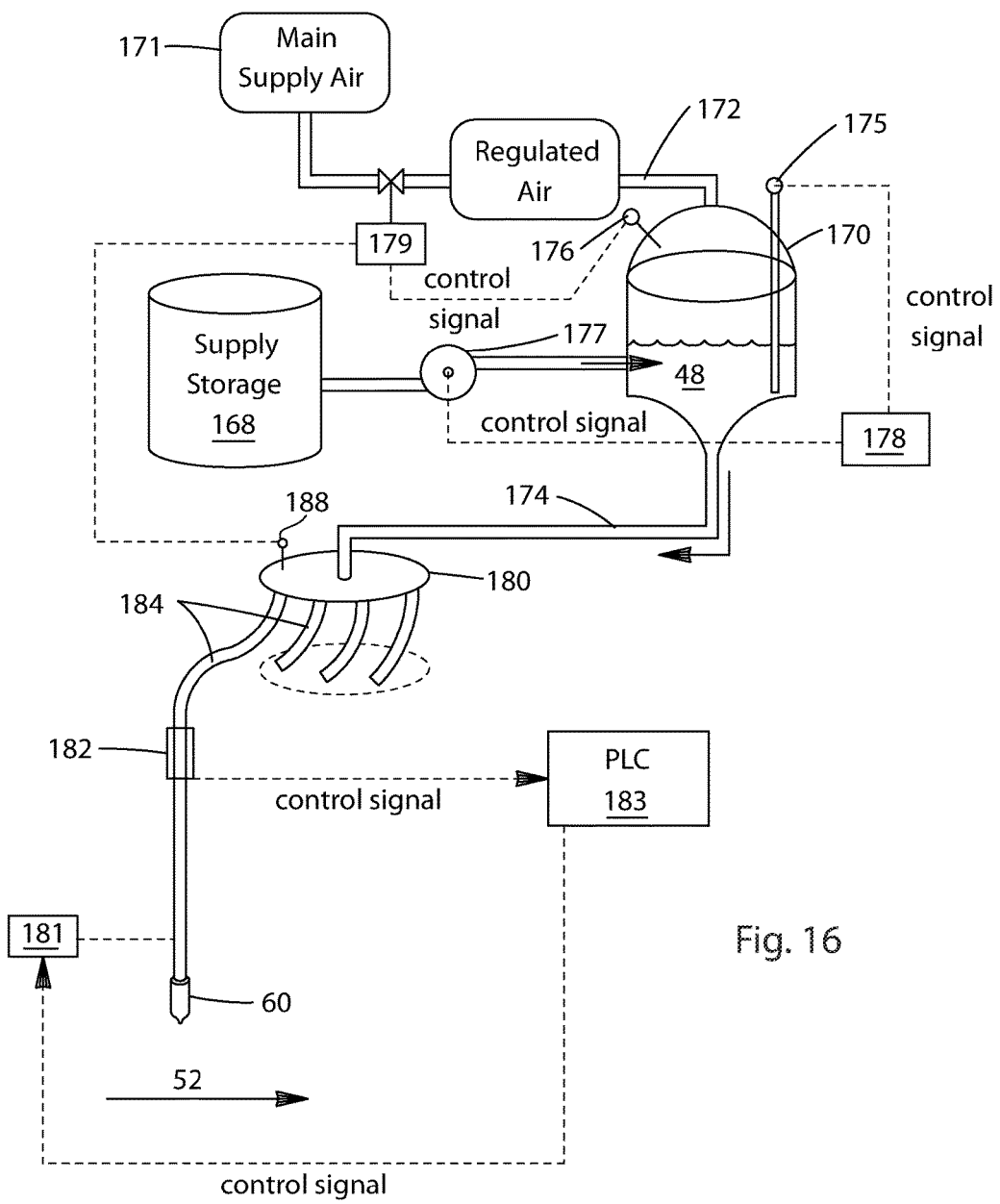
FIG. 16 is a schematic perspective view of a filling system for filling receptacles.

FIG. 16 is a schematic illustration of one embodiment of a filling system. As shown in FIG. 16, the filling system comprises a storage supply 168 for liquid 48 to be deposited onto or into the receptacle, such as the lower web of material 52. The storage supply of liquid 168 is connected by piping to a tank 170 of liquid 48. The tank 170 may be pressurized, or for low viscosity products, it need not be pressurized and may rely on liquid level for head pressure control. In the embodiment shown in the drawings, it is pressurized. A regulated air pressure line 172 connects the tank 170 to a main supply of air 171, and also has the ability to vent excess pressure in the tank based on the air cap pressure control 179. A line 174 for transporting the liquid 48 to the nozzle 60 connects the tank 170 to the nozzle 60. The liquid supply tank 170 is equipped with level 175 and pressure instrumentation 176 to allow for fast and accurate head pressure control and monitoring. A combination of liquid level control 178 utilizing the tank level sensor 175 and control of the inlet flow through various means (such as pumps 177, valves, or an air-driven pig), along with tank air cap pressure control 179 allows for modulation of the net nozzle head pressure. Both the tank level control 178 and the tank air cap pressure control may either be stand-alone controllers or resident in the PLC 183 as an overall integrated process control system. If there are multiple nozzles, the nozzles may be connected to a manifold 180 and individual nozzle piping 184, which may be of identical configuration for all the nozzles. If desired, an additional pressure sensor 188 can be added near the manifold 180 to provide an additional total head pressure (liquid head plus air cap head) monitoring point, which can be used to provide an overriding pressure adjustment to the air cap pressure control 179 or liquid level control 178 to maintain a constant total head pressure.

The nozzle 60 may have an actuator system 181 connected thereto to provide fast response, positive on/off control of the liquid. The actuator system 181 can comprise any suitable device, including but not limited to a positive displacement pump, one or more valves, such as air-driven (pneumatic) solenoid valves 186, or electrically-driven solenoid valves. The nozzle actuator system 181 may be connected to a flow measurement device (or flow feedback device) such as a flow meter 182. The flow feedback device may be a mass flow meter or a volumetric flow meter to provide for accurate and fast acquisition of each sample mass or volume of fluid, respectively. A programmable logic controller (PLC) 183 and associated high-speed input 185 and output 187 devices (such as input and output cards in FIGS. 16A and 16B) may be in communication with the pump, the valve(s), and the flow meter, and may be used to allow for timely mass or volume totalizations and nozzle control of each mass or volume fill, as well as for the level and tank air cap pressure control outlined above.

The input device 185 can be any device that is capable of obtaining data from the flow meter 182. The input device 185 should be of a type that is capable of most quickly obtaining data from that particular type of flow meter 182. The input device 185 may, thus, be selected from the group that includes, but is not limited to: a network card, an Ethernet connection, a digital counter card, and an analog card. The actual flow quantity may be calculated in the PLC, or on the input device 185, or may be calculated in the flow meter 182 itself depending on the flow meter type, how input is received, and any pre-processing necessary. The PLC, thus, receives a flow feedback quantity to compare against the desired setpoint to generate an error, and then uses that to calculate the corrective action such as a new control actuation time. The high-speed output device 187 is described in greater detail below.

An algorithm is associated with the PLC (such as by being programmed into the PLC). The algorithm receives the measured fill quantity feedback as input, and makes corrective adjustments. Data from the PLC can be used to compute adjustments to the time of fill, and the precision timing of the output command to the solenoid for valve control or a control adjustment to the total flow and flow rate profile of a positive displacement pump for each fill cycle. If appropriate high-performance components are coupled with the proper control system structure and algorithms, a filling system providing rapid, high-accuracy fills with a controlled deposit profile (if desired) can be achieved. Such a filling system can, if desired, be used to quickly and accurately dispense relatively small doses of products (for example, less than or equal to about 5 grams of product). In some cases, the product doses can be dispensed in less than or equal to about 100 milliseconds. In some cases, the cycle time in which doses can be dispensed, measured, control correction calculated and any reciprocating nozzle carriage returned to position so that it is ready for next dispense can be carried out in less than or equal to about 300 milliseconds, alternatively less than or equal to about 200 milliseconds; or in a range of from about 50 or about 100 milliseconds to about 300 milliseconds, alternatively from about 50 milliseconds to about 200 milliseconds. The dispensing can also be coupled with precision motion control of the nozzle relative to the receptacle to provide a controlled deposit profile.

To achieve accurate, high-speed filling which may be coordinated with nozzle/receptacle motion requires a control system, actuators, sensors, and design of the control system algorithm and architecture to tightly synchronize these capabilities. It also requires a well-designed fluid re-supply system for the main fluid supply tank 170 which minimizes head pressure disturbances along with a well-designed head pressure control system which can reject pressure disturbances to the system. This is done through selection of the proper control system components and then combining them in a manner which allows for the most optimal control of the interacting systems. For the high-speed filling, it is desirable that all the components required for the nozzle control as well as the flow mass feedback measurement system meet certain dynamic performance requirements.

Figure 16A:
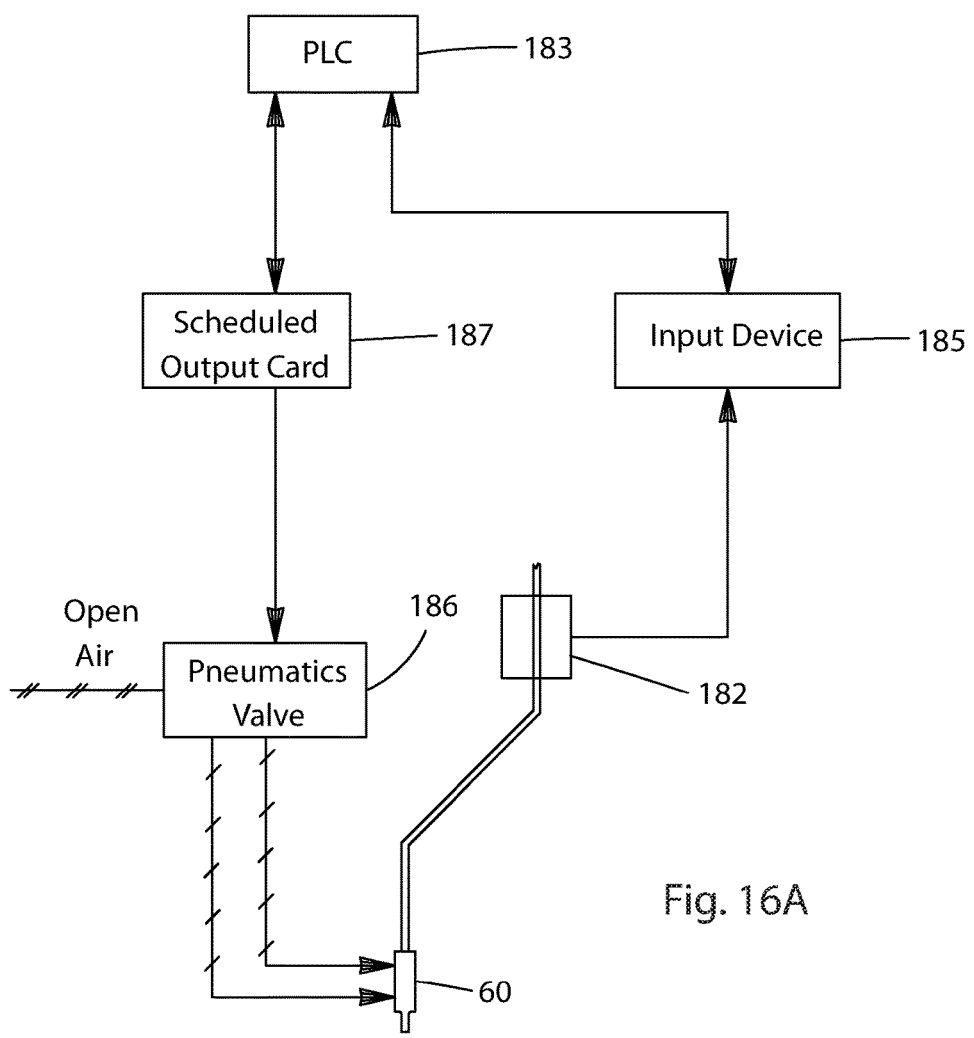
FIG. 16A is a schematic diagram of one filling control system.

One embodiment of such a filling control system is shown in FIG. 16A. The nozzle actuation components may be selected so that the time from initiation inside the PLC 183 to actual nozzle 60 being full open is not more than 30 milliseconds. This is executed using an output device such as a scheduled output device (for example, a programmatically scheduled digital output card) 187, which electrically controls a valve such as a pneumatics valve 186, which is located in close proximity to the nozzle 60. The scheduled digital output card 187 has its own processor. This provides the advantage of being able to operate without delays in waiting for a signal from the PLC, and being able to interpolate needed on/off events between PLC updates to the card. The scheduled output may have the ability to control digital outputs in time period increments less than 100 microseconds, and optionally can be programmatically controlled to trigger open using a particular electronic motion position and stay open for the control algorithm-generated amount of time. The control system has the ability to tie the flow meter filling to customized flow shape profiling by utilizing the scheduled output card, along with development and execution in the PLC 183 of cammed motion profiles for the nozzle relative to the receptacle. The flow meter component 182 and associated digital input card 185 may have internal parameter settings to provide no more than 30 milliseconds of delay time from actual flow initiation until flow measurement detected in the PLC 183, and provide repeatable measurement capability within the allotted full cycle time cycle of 10% or less from weighed samples. The 10% accuracy referred to herein is the actual weighed mass versus target fill mass. This is to be distinguished from the variability shown in electronic measurement readings. In other words, the electronic mass measurement may show low variability, but be off by a bias, and in the present method, this can be corrected to make final mass deposited within 10% of target mass value.

In general, the version of the control system described herein that uses both the high-speed flow meter counter card 185 as well as the scheduled output card 187, when designed with the proper algorithm, is unique in that it allows for very tight synchronization of the fluid filling control system (i.e., fill start or stop) with the motion control system (when web or unit operation in specific position), while also allowing for very accurate filling time control (control on/off time to fractions of a millisecond) due to the designed control system architecture, algorithm and component selection.

An alternative version of a filling control system is shown in FIG. 16B. This alternative filling control system which may not offer as tight of synchronization with the motion position nor quite as accurate of filling control accuracy utilizes a high-speed counter input card, which can have high-speed output capability. The control algorithm in this case typically needs to provide a trigger point for when the high-speed input counter increases beyond a mass totalization threshold during the fill; the output is triggered to close the filling valve. This mass totalization threshold, or shut-off trigger, will be a mass value less than or equal to the desired final totalized mass due to system time delays.

In summary, the filling control system utilizes the following: input of feedback from the flow measurement system; output control of when and how long the nozzle is open; and the algorithm provides the corrected fill time and either the start or stop trigger related to a process variable (such as position of the nozzle relative to the receptacle). In the case of embodiments such as that shown in FIG. 16A, the scheduled output card provides the ability to accurately start or stop the fill cycle at times which may occur between updates from the PLC. (The scheduled output card can interpolate where the dispensing system is position/process wise, and can trigger an on or off signal in between communications from the PLC.) The control algorithm uses the flow volume or mass feedback (that is fill quantity feedback measurement) to make corrective adjustments in the filling time, and outputs at least one of a control signal and a control actuation time for when the dispensing device actuator system should be supplying the fluid. The control signal may comprise a control "on" or "off" signal, or it may comprise a signal to the scheduled output card so that the scheduled output card can interpolate and trigger an on or off signal (as described above). The output sets either when the start or stop (but typically not both) of the fill will occur. The opposite (stop or start) is then set by adding/subtracting the corrective fill time provided by the algorithm).

In the case of the embodiment shown in FIG. 16B, the algorithm provides a corrective fill quantity total threshold target (meaning it can be dynamically changed using the feedback/error) and sends it to the combined digital input/output card every fill cycle. The use of the scheduled output card in the embodiment shown in FIG. 16A, however, can more accurately set the absolute start or end of fill, as well as more accurately set the total amount of time the nozzle is open (fill time).

As shown in the overall depiction of FIG. 3, downstream of the dispensing zone 58, a second web of material, such as an upper web film 62, is brought into the process above the lower web of material 52. Although the following may describe the second (or upper) web of material as a film, it is understood that the second web of material is not limited to a film. The upper web of material may be any type of materials specified herein as being suitable for use as the lower web of material. The upper web of material 62 is held to the underside of a horizontal, upper forming conveyor (or "upper conveyor") 64. The upper conveyor 64 may be a vacuum conveyor.

The upper web of material 62 can be laid flat on top of the formed lower web of material 52 without deflecting the upper web of material 62. However, the upper conveyor 64 may also have a profiled surface to create channels or troughs in the upper web of material 62. The channels or troughs in the upper web of material 62 may be of substantially the same width and depth as the troughs or cavities 56 into which the lower web of material 52 is deflected.

There are several reasons it is desirable to deflect the upper web of material 62. Deflecting the upper web of material 62 similarly to the lower web of material 52 provides clearance above the mounded product 48 which has just been placed on the lower web of material 52, and avoids smearing liquid products across the lower web of material 52. Smearing of liquid products can lead to a variety of problems with the sachet such as wrinkles and/or leaks. Deflecting the upper web of material 62 also creates a more symmetrical sachet. In addition, on typical sachets, the film on both sides of the sachet will have printing thereon (for example, the product name and product information) which is generally surrounded by an unprinted portion that will be disposed in the seal area of the finished sachet. Deflecting the upper web of material 62 similarly to the lower web of material 52 allows a film of the same or substantially the same width to be used for both the lower and upper web of materials, and creates the same width reduction in both films during the manufacturing process so that the printed and unprinted portions of the film will align with each other. Of course, in other embodiments, the film can be free of printing. In still other embodiments, the printing can be added to the film after the package is formed.

A similar forming process to that used to form the lower web of material 52 (that is, a similar system of a static plate, moving belts, or combinations thereof) can be used to deflect the upper web of material web 62. FIG. 11 shows one embodiment of an upper forming element 90 for use in an apparatus that is two lanes wide, comprising lanes L1 and L2. In other words, the upper forming element 90 has (at least) two sets of cavities 96 therein. In such an embodiment, the top film 62 will have a great enough width to be drawn into the upper cavities 96 in the adjacent lanes L1 and L2. The step of deflecting the upper web of material web 62, and the properties of the upper web of material 62 during deflection can be substantially the same as in the case of the lower web of material 52. (For example, the upper web of material 62 may undergo elastic deformation, but be substantially free of plastic deformation.)

As shown in FIG. 11, the upper forming element 90 comprises a plate having raised surfaces 108 that are located between, as well as laterally outside of, the upper recesses or cavities 96. In one non-limiting embodiment, the cavities 96 are 30 mm wide, and the raised surfaces 108 have a width of 14 mm. The raised surfaces 108 have longitudinal side edges 109 that are radiused to avoid tearing the upper web of material 62. The raised surfaces 108 have vacuum channels 110 therein to hold the upper web of material 62 against the raised surfaces 108. The upper plate also has vacuum channels 112 in the recesses 96. The vacuum channels 110 and 112 are connected to a vacuum manifold which is connected to a vacuum source. A moving belt 80 similar to that shown in FIG. 8 or FIG. 10 is located within each of the upper cavities 96, or in a recess 96A adjacent to, or within, each of the upper cavities 96. In FIG. 11, recesses 96A are formed into the base of the cavities 96. As in the case of the lower cavities, at least a portion of the bottom of the forming cavities 96 may be formed by the top surface 81 of the belts 80. (It should be understood that the portion of the upper cavities 96 into which the upper web 62 is deflected furthest will be referred to as the "bottom" of the cavities, even though the upper cavities 96 are inverted relative to the bottom cavities 56. The same convention will be applied with respect to the belts 80 in the upper cavities 96. Thus, the "top surfaces" of the belts in the upper cavities will correspond to the same surfaces as the top surfaces of the belts in the lower cavities 56.) Vacuum is used to form the web (or retain a pre-formed upper web in a deflected condition), and the belts 80 are used to transport the web 62 across the rigid, non-moving forming plates.

As in the case of the lower forming element, there may be vacuum channels 114 leading to the top surfaces 81 of the belts 80. The belts 80 may have vacuum holes 79 therein for maintaining the web 62 in contact with the top surfaces 81 of the belts 80. In the embodiment shown in FIG. 11, the vacuum holes 79 are located along each longitudinal side portion of the belts 80, although in other embodiments, the vacuum holes can be located elsewhere in the belts, such as along the sides of the belt as shown in FIG. 8.

Figure 12:
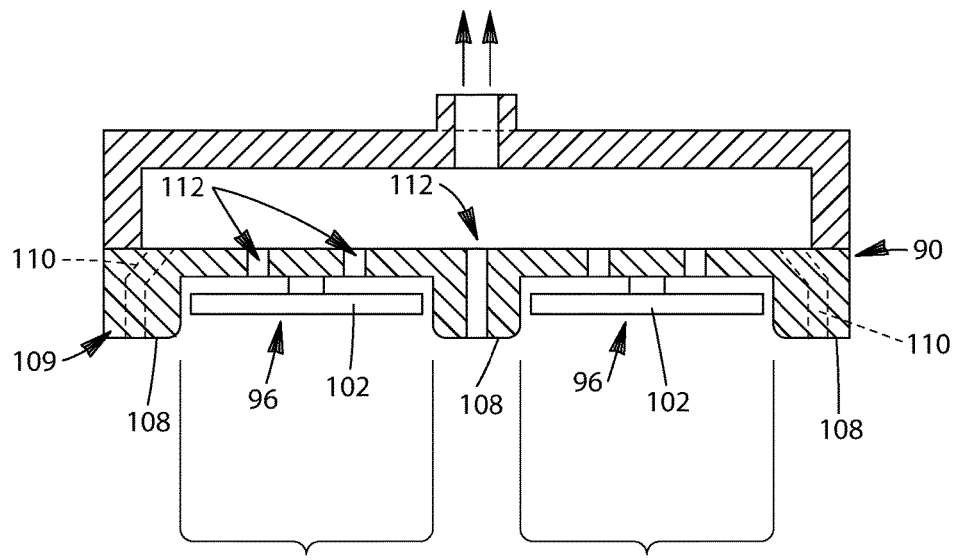
FIG. 12 is a schematic cross-section of a variation of the forming apparatus shown in FIG. 11, in which only the top plate is shown.

FIG. 12 shows an alternative embodiment of the upper plate 90 in which the cavities 96 do not have a separate recess in the floor of the same. In one variation of this alternative embodiment, the belts (if present) are disposed outward from the floor of the cavities 96, but are still located within the cavities. (Such belts would be in the space occupied by the elements designated 102.) In this embodiment, there is a gap between the sides of the cavities 96 and the side edges of the belts. In this embodiment, the distance between the top of the raised surfaces 108 and the top of the belts is the depth of the top cavity. In another variation of this embodiment, there are no belts. In such a variation, location that would otherwise be occupied by the belts can comprise a stationary plate or piece 102 that is spaced away from the inwardmost portion of the recess to allow for passage of air around the stationary plate 102.

It should be understood that the depth of the top cavities 96 and the depth of the bottom cavities 56 may be the same, or the depth of the top cavities 96 may be less than, or greater than the depth of the bottom cavities 56. For example, in embodiments in which there are cross rails 86 forming the bottom cavities, the depth of the bottom cavities 56 may be 4 mm, and the depth of the top cavity or cavities 96 may be about 3 mm in order to provide the same cross machine direction phasing of the upper web of material 62 due to contouring of the lower web of material 52 by the cross rails forming the bottom cavities 56.

In embodiments in which the films are primarily shaped by a mechanical apparatus, the upper web of material 62 can be retained with 50 inches (about 130 cm) of water vacuum. In other embodiments, the films are primarily shaped by vacuum. In the latter embodiments, if the apparatus is twelve lanes wide, the portions of the upper web of material in the center six lanes can be formed with 40-50 inches (about 100 to 130 cm) of vacuum. The portions of the upper web of material 62 in the outer three lanes on each side of the center lanes can be formed with between about 15 to 25 inches (about 38 to 65 cm) of vacuum.

Figure 17:
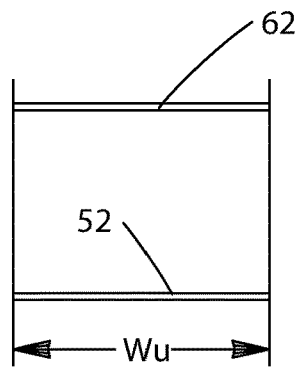
FIG. 17 is a schematic cross-section showing undeformed upper and lower webs of material.
Figure 18:
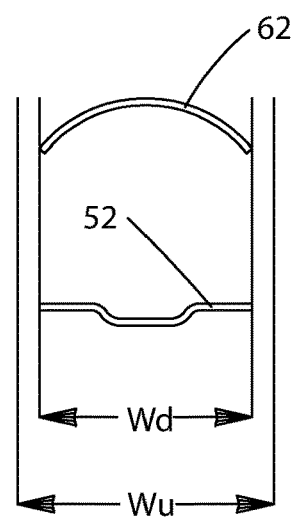
FIG. 18 is a schematic cross-section of one embodiment in which the upper and lower webs of material are deformed in the cross-machine direction.

The lower web of material 52 and the upper web of material 62 are deflected into the lower cavities 48 and upper cavities 96, respectively, so that the lower web of material 52 and the upper web of material 62 each have a profile in the cross machine direction. The lower and upper web of materials 52 and 62 will, therefore, have a deflected cross machine direction width that is less than their undeflected width. FIG. 17 shows the un-deflected widths Wu of the lower web of material 52 and the upper web of material 62. FIG. 18 shows the deflected widths Wd of the lower web of material 52 and the upper web of material 62 relative to their undeflected widths $W_U$. The deflected cross machine direction width Wd of the lower web of material 52 may be substantially the same as that of the upper web of material 62. The term "substantially the same", as used herein in reference to the relative deflected widths Wd of the materials refers to deflected widths that differ by less than or equal to about 0.2% of each other. In some embodiments, it may be desirable for the deflected widths Wd to differ by less than or equal to about 0.1% of each other. If the apparatus 50 has at least two cross-machine direction lanes, it may be desirable for the deflected cross machine direction widths Wd of the lower web of material 52 and the upper web of material 62 in each lane to be substantially the same (differ by less than or equal to about 0.2%). The deflected portion of the top web of material 62 and bottom web of material 52 may be symmetrical. Alternatively, as shown in FIG. 18, the deflected portions of the top web of material 62 and bottom web of material 52 may have different configurations, provided that the deflected portions in each lane is reduced in width by substantially the same amount.

Figure 19:
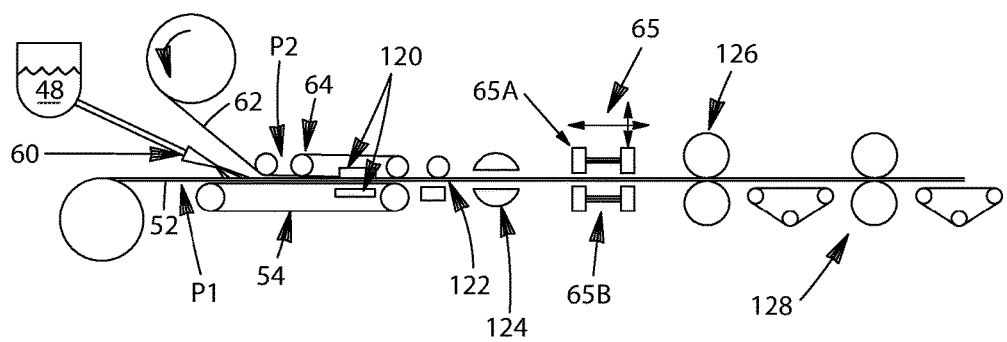
FIG. 19 is a schematic side view of one complete embodiment of a HFFS method and apparatus in which the top and bottom web forming sections are combined with sealing mechanisms.

FIG. 19 shows one non-limiting embodiment of a complete process of forming sachets, with further details on the sealing steps. As shown in FIG. 19, the two webs of material (e.g., films) 52 and 62 are unwound such that the sealant sides of the materials are facing inward. The bottom film 52 forming begins first. The bottom film 52 may be (optionally)

mechanically pre-formed using an apparatus such as shown in FIGS. 5 and 6 at location P1. Vacuum is applied to the bottom film 52 by the lower conveyor 54 to either form the bottom film into the cavities or to retain the pre-formed film in the cavities. A product 48 is dispensed into the troughs, or cavities formed in the bottom film 52, such as from one or more nozzle(s) 60. The top film 62 may be (optionally) mechanically pre-formed using an apparatus such as shown in FIGS. 5 and 6 at location P2. Vacuum is applied to the top film 62 by the upper forming conveyor 64 to either form the top film into the configuration of a trough or cavities, or to retain the pre-formed film in such a configuration. The top film 62, in this embodiment, is formed to the same profile in the cross machine direction as the bottom film 52.

In this embodiment, a machine direction seal-forming device 120 that is used to form longitudinal or machine direction seals is shown adjacent to the forming conveyors 54 and 64. The machine direction seals will form the side seals on the sachets. The machine direction seal forming device may be in the form of machine direction (MD)-oriented heated elements (bars) 120 that are located between adjacent lanes and also laterally outside the first and last lanes. The heater bars 120 may be spring loaded vertically against each other to seal the two films 52 and 62 together. The seal-forming device 120 ideally provides adequate pressure to minimize any air between the sealant layers of the films 52 and 62 so that the sealant layers are in intimate contact. The sealant layers are heated to their melting point to heat seal the same together.

After the longitudinally sealed and filled web leaves the forming area, there may be a machine direction sealing nip 122. The machine direction sealing nip may be driven or undriven. The machine direction sealing nip 122 applies a light pressure to ensure adhesion of the films in the areas of the longitudinal seals (but preferably does not apply pressure to the portions of the film on which the product 48 has been deposited). In one embodiment, the nip 122 may be formed by a relatively soft roll and an anvil roll. The relatively soft roll may comprise a roll having a surface comprising a 20 Shore A durometer material. Such a roll can be used to press the machine direction (or longitudinal) sealed portions together better for more uniform contact. At least one of the rolls forming the nip may also be chilled to cool the MD seals.

After the machine direction sealing nip 122, an optional pair of opposed vacuum plates 124 may be used to keep the two film materials 52 and 62 separated in the unsealed areas so that the doses of material 48 deposited in discrete positions on the lower web of material 52 remain separated.

Downstream of the filling and forming conveyors 54 and 64 is a device 65 for forming cross machine direction-oriented seals. This will be referred to as the CD sealing device 65. The CD sealing device 65 can be any suitable device that is capable of forming cross machine direction-oriented seals between the webs 52 and 62 in the space between product doses. One version of such a device is shown in FIG. 3, which comprises a pair of upper and lower components 65A and 65B, such as cross machine oriented bars 65A and 65B that come together to form a single CD seal. The CD sealing device can be stationary relative to the machine direction movement of the films 52 and 62, such that the upper and lower cross machine oriented bars 65A and 65B only move toward each other and apart. In other embodiments, the upper and lower cross machine oriented bars 65A and 65B may move with the films 52 and 62. In the embodiment shown in FIG. 3, the upper and lower cross machine oriented bars 65A and 65B move parallel to the films 52 and 62 in a reciprocating fashion (in the direction of arrows), while simultaneously bringing the upper and lower cross machine oriented bars 65A and 65B against the films as they move with the films.

Figure 20:
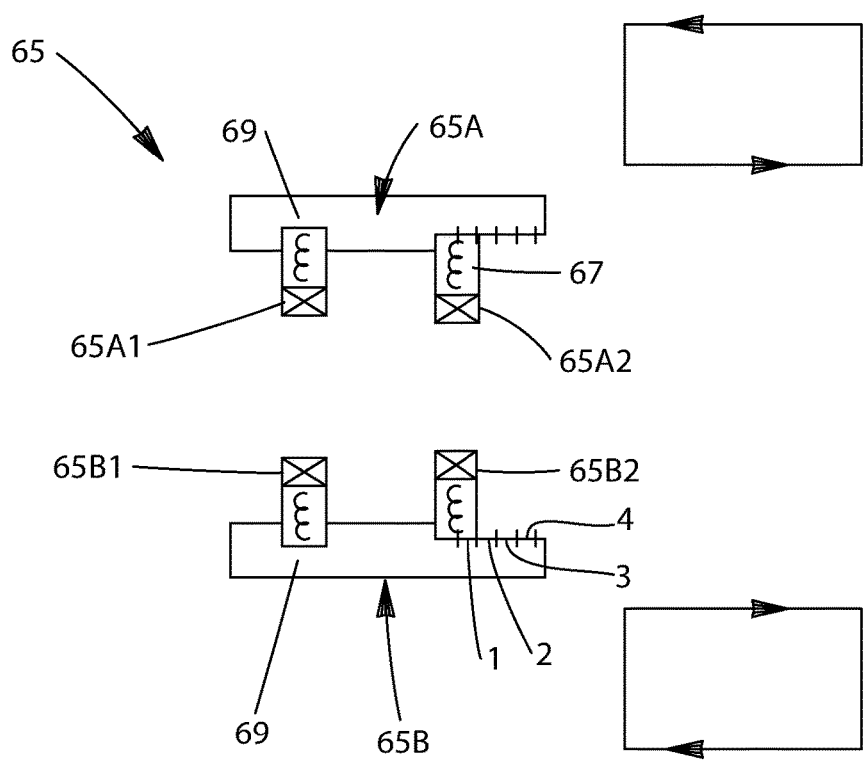
FIG. 20 is a schematic side view of one embodiment of a portion of the apparatus that is used for forming cross machine direction seals.

In other embodiments, such as shown in FIG. 20, the CD sealing device 65 can comprise sealing components having other configurations. FIG. 20 shows an embodiment in which the upper and lower components 65A and 65B comprise generally U-shaped elements that each comprise a pair of spaced apart sealing bars 65A1 and 65A2, and 65B1 and 65B2, respectively. The two sealing bars allow for more dwell time sealing versus only one sealing bar. The sealing bar unit 65 traverses back and forth (upstream and downstream) relative to product flow while the sealing bars 65A and 65B open and close to seal the films 52 and 62. The sealing bars can each be provided with a spring 67 that is located between the sealing bar and a frame 69 so that they are spring loaded to move vertically upward and downward. The upper and lower components 65A and 65B of the CD sealing device 65 shown in FIG. 20 can be used to simultaneously form the seals at the top and at the bottom of a sachet. The sealing components 65A and 65B comprise an upstream sealing bar, such as 65A1 and 65B1, and a downstream sealing bar, such as 65A2 and 65B2.

When each sealing component 65A and 65B comprises more than one sealing bar, the sealing bars can be fixed relative to each other, or adjustable relative to each other. It may be desirable for at least one of the sealing bars in each sealing component to be fixed. The fixed sealing bar can either comprise the upstream sealing bar, or downstream sealing bar. In the embodiment shown in FIG. 20, the downstream sealing bars 65A2 and 65B2 are adjustable with different settings 1, 2, 3, and 4. Making at least one of the sealing bars adjustable allows the spacing between seals to be adjusted to accommodate changes in package length. Of course, other variations of such components are possible, including those that have additional sealing bars that are capable of simultaneously forming three or more CD seals, such as between multiple sachets.

The vacuum applied to the films 52 and 62 during formation of the package can be released at any suitable stage in the process. The vacuum can be released at any of the following times: (1) before the formation of any of the seals (in which case the residual vacuum remaining on the lower web of material 52 after the initial application of vacuum to deflect the lower web of material may continue to hold the lower web of material 52 in place); (2) after the formation of the machine direction seals; (3) after the formation of one of the CD seals on a given package; or, (4) after the formation of all seals on a given package. Typically, the vacuum will be released after the formation of the machine direction seals in order to facilitate the formation of the CD seals. When the vacuum is released, the deflected portions of the first web of material (and of the second web of material, if deflected) return toward their original un-deflected configurations. The deflected portions may return completely to their un-deflected configuration, or only part of the way to their un-deflected configuration (the term "toward" is intended to include both). Typically, the deflected portions will return only part of the way to their un-deflected configuration due to the presence of the product 48 between the webs of material comprising the package.

Downstream of the cross sealing device 65 are an apparatus 126 for forming machine direction slits, and an apparatus 128 for cross machine direction perforation/cutting. The machine direction slitting can be done by any suitable mechanism 126, including but not limited to by a crush slitter against an anvil or by a shear slitting apparatus. The web of unit dose packages can be slit between each lane or otherwise as desired. The slits can be continuous or they can be intermittent perforations. The cross machine direction perforation process can be designed and operated to cut between specified rows to make mats (matrices of products). In the embodiment shown in FIG. 19, mechanical tooling is used for both the machine direction slitting apparatus 126 and the cross-machine direction slitting apparatus 128. However, laser slitting in the machine direction or cross machine direction can be utilized.

Numerous alternative embodiments of the apparatus 50 are possible. For example, in other embodiments, the entire system could comprise moving belts such as shown in FIG. 8 or 10, and the side rails 82 can be eliminated and replaced with corresponding raised surfaces on a wider moving belt. In these or other alternative embodiments, rather than having vacuum ports in the gaps between the belt 80 and the side rails 82, the belt 80 can have vacuum ports in the center of the pockets 56. In still other embodiments, the belt system can be replaced with a chain system that links discrete molds that have cavities formed therein. However, the fabrication of individual molds for such a system is more costly than the moving belt system described herein. In addition, if it desired to change the system in order to make different size sachets, the moving belt system is more easily changed. More specifically, a platen system couples the forming and drive functionality in one component, where the belt/plate system described herein decouples the forming from the means of web transport. This provides the flexibility to change the properties of the belt moving the web separately from the shape of the tooling forming the pockets. The range of possible operating conditions is broader when forming and web transport are decoupled as described herein. It is also a more economical way to achieve the same purpose, in addition to being easier for maintenance. Tolerances can be set up easily on the forming tooling and maintained accurately with little maintenance, because these are not moving parts. The only wear part is the belts, which are stock items.

As discussed above, the filling system and filling control system can be applied to alternative types of filling processes. This can be used to provide accurate dispensing and short cycle times, as well as to coordinate the filling with the movement of receptacles to be filled. The movable nozzles and sealing mechanisms described herein can also be applied to alternative types of filling processes. For example, the filling system and filling control system can be used in a VFFS embodiment such as shown in FIG. 2.

A vertical form, fill, and sealing (VFFS) apparatus 30 such as that shown in FIG. 2 can have stationary nozzles 36 and stationary seal bars 40 and 42 while the machine is running. However, the nozzles 36 may need to be able to move up and down in the event it is desired to change the sachet length. This is a setup change that may be made when the machine is not running. In one embodiment, the MD seal bars 40 can be fixed on one side of the webs, with the surface of the fixed MD seal bars in a plane that is aligned with the centerline of the nozzle 36. The opposing MD seal bars 40 can be spring loaded up against the fixed seal bars with the films 32 and 34 in between. The nozzles 36 may, for example, remain fixed at a nominal 20-90 mm above the initial contact point of the CD sealing bar 42, depending on sachet length, and fill volumes.

When more process adjustment is needed, the MD seal bars 40, nozzles 36, or both could move up and down in conjunction with the webs' 32 and 34 downward motion. The MD seal bars 40 could move straight up and down.

Alternatively, the MD seal bars 40 could move in a semi-elliptical motion, spreading apart about 1 mm, just enough to lose contact with the films 32 and 34. The bars 40 could then contact the film, move down a distance, such as from about 5 to about 50 percent of the sachet length, with their movement matched with the film speed, then retract and return to the starting contact position. It is desirable that the motion and length of the seal bars are designed to ensure that there is a contiguous MD seal between what will be successive sachets prior to cutting the webs into individual sachets.

Further, the nozzles 36 can be moved such that the nozzle tip 38 always remains at a fixed distance from the fill target. For example, if the bottom of the sachet is located 25 mm below the tip 38 of the nozzle 36 when the filling starts, the nozzle 36 could retract upward as the filling progresses such as to maintain at least the 25 mm spacing from the tip 38 of the nozzle 36 to the top of the fluid patch. The nozzle 36 could then retract faster upward at the end of the fill to allow for the CD sealer 42 to close. One other alternative for nozzle movement would be to have the nozzles 36 spaced farther away from the CD seal bar 42 when the seal is first made to reduce the deformation in the sachet. The tip 38 of the nozzle 36 could then lower into the sachet once the CD seal process has been initiated to progress through the bottom-up fill sequence described above.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for making a package containing a consumer product comprising the steps of:

a) placing a first web of material having an original un-deflected configuration adjacent to an element having a cavity therein, and moving said first web of material over the element having the cavity therein; wherein the cavity is in the form of a continuous trough in the direction the web is moved;

b) temporarily deflecting a portion of the first web of material downward into the cavity to form a deflected portion of said first web of material, wherein said deflected portion of said first web of material is substantially free of plastic deformation;

c) depositing two or more discrete products onto the first web of material;

d) placing a second web of material over the first web of material and the products; and providing an upper element having an upper cavity therein, and deflecting a portion of said second web of material into said upper cavity; and e) at least partially closing and sealing the first web of material having the deflected portion therein to said second web of material along one or more sealing lines.

2. The process of claim 1 further comprising a step (f) of allowing said deflected portion of said first web of material to return toward its original un-deflected configuration, wherein the step (b) of temporarily deflecting a portion of the first web of material is at least partially carried out using vacuum, and the step (f) comprises releasing the vacuum applied to the first web of material, and releasing the vacuum occurs before step (d).

3. The process of claim 1 further comprising a step (f) of allowing said deflected portion of said first web of material to return toward its original un-deflected configuration, wherein the step (b) of temporarily deflecting a portion of the first web of material is at least partially carried out at using vacuum, and the step (f) comprises releasing the vacuum applied to the first web of material, and releasing the vacuum occurs after step (d).

4. The process of claim 1 further comprising a step (f) of allowing said deflected portion of said first web of material to return toward its original un-deflected configuration, wherein the step (b) of temporarily deflecting a portion of the first web of material is at least partially carried out at using vacuum, and the step (e) of at least partially closing and sealing the material having the deflected portion therein with a second web of material comprises completely closing and sealing the material with said second web of material, and the step (f) comprises releasing the vacuum applied to the first web of material occurs after step (d).

5. A process for making a package containing a consumer product comprising the steps of:

a) placing a first web of material having an original un-deflected configuration adjacent to an element having a cavity therein, and moving said first web of material over the element having the cavity therein; wherein the cavity is in the form of a continuous trough in the direction the web is moved;

b) temporarily deflecting a portion of the first web of material downward into the cavity to form a deflected portion of said first web of material, wherein said deflected portion of said first web of material is substantially free of plastic deformation;

c) depositing two or more discrete products onto the first web of material;

d) placing a second web of material over the first web of material and the products; and e) at least partially closing and sealing the first web of material having the deflected portion therein to said second web of material along one or more sealing lines; wherein the first web of material and the second web of material are deflected into the lower cavity and into an upper cavity, respectively, so that said first web of material and said second web of material each have a profile in the cross machine direction, and said first and second webs of material have a deflected cross machine direction width that is less than their undeflected width, and the deflected cross machine direction widths of said first web of material and said second web of material are substantially the same.

6. The process of claim 5, wherein said element comprises a lower element with at least two lower cavities arranged in adjacent lanes in the cross-machine direction, wherein the first web of material spans said at least two cavities in adjacent lanes, and the step d) further comprises providing an upper element having an upper cavity therein with at least two upper cavities arranged in adjacent lanes in the cross-machine direction, into each of which lower cavities a portion of said first web of material is deflected, wherein the second web of material spans said at least two upper cavities in adjacent lanes, into each of which upper cavities a portion of said second web of material is deflected, wherein the deflected cross machine direction widths of said first material and said second material in each lane are substantially the same.

7. A process for making a package containing a consumer product comprising the steps of:

a) placing a first web of material having an original un-deflected configuration adjacent to an element having a cavity therein, and moving said first web of material over the element having the cavity therein; wherein the cavity is in the form of a continuous trough in the direction the web is moved;

b) temporarily deflecting a portion of the first web of material downward into the cavity to form a deflected portion of said first web of material, wherein said deflected portion of said first web of material is substantially free of plastic deformation;

c) depositing two or more discrete products onto the first web of material;

d) placing a second web of material over the first web of material and the products; and providing an upper element having an upper cavity therein, and deflecting a portion of said second web of material into said upper cavity; wherein the upper cavity is a continuous inverted trough; and e) at least partially closing and sealing the first web of material having the deflected portion therein to said second web of material along one or more sealing lines.

* * * * *